US012657744B2

(12) United States Patent
Soper et al.

(10) Patent No.: US 12,657,744 B2
(45) Date of Patent: Jun. 16, 2026

(54) SYSTEMS AND METHODS RELATED TO REGISTRATION FOR IMAGE GUIDED SURGERY

(71) Applicant: INTUITIVE SURGICAL OPERATIONS, INC., Sunnyvale, CA (US)

(72) Inventors: Timothy D. Soper, San Jose, CA (US); Vincent Duindam, San Francisco, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 35 days.

(21) Appl. No.: 17/965,396

(22) Filed: Oct. 13, 2022

(65) Prior Publication Data

US 2023/0030727 A1     Feb. 2, 2023

Related U.S. Application Data

(63) Continuation of application No. 17/051,227, filed as application No. PCT/US2019/031039 on May 7, 2019, now Pat. No. 11,514,591.

(Continued)

(51) Int. Cl.
  *G06T 7/33*          (2017.01)
  *G06T 7/73*          (2017.01)
(52) U.S. Cl.
  CPC .................. *G06T 7/33* (2017.01); *G06T 7/73* (2017.01); *G06T 2207/10072* (2013.01);
(Continued)
(58) Field of Classification Search
  CPC ... G06T 7/33; G06T 7/73; G06T 2207/10072; G06T 2207/20021; G06T 2207/20104;
(Continued)

(56) References Cited

U.S. PATENT DOCUMENTS

| | | | |
|---|---|---|---|
| 6,380,732 B1 | 4/2002 | Gilboa | |
| 6,389,187 B1 | 5/2002 | Greenaway et al. | |

(Continued)

FOREIGN PATENT DOCUMENTS

| | | |
|---|---|---|
| CN | 103229210 A | 7/2013 |
| CN | 103330616 A | 10/2013 |

(Continued)

OTHER PUBLICATIONS

Jean-Philippe Thirion. Image matching as a diffusion process: an analogy with Maxwell's demons. Medical Image Analysis, 1998, 2 (3), pp. 243-260. ffinria-00615088 (Year: 1998).*

(Continued)

*Primary Examiner* — Ming Y Hon
(74) *Attorney, Agent, or Firm* — Haynes & Boone, LLP.

(57)          ABSTRACT

A system is configured to perform operations includes accessing a set of model points of a model of an anatomic structure of a patient, the model points being associated with a model space. A set of measured points of the anatomic structure of the patient are collected, the measured points being associated with a patient space. The set of model points are registered to the set of measured points using a first set of initial parameters to generate a first transformation. One or more sets of perturbed initial parameters are generated based on the first set of initial parameters. One or more perturbed registration processes are performed to register the set of model points to the set of measured points using the one or more sets of perturbed initial parameters respectively to generate corresponding perturbed transformations. A registration quality indicator is generated based on the first transformation and the one or more perturbed transformations.

20 Claims, 12 Drawing Sheets

Related U.S. Application Data

(60) Provisional application No. 62/670,530, filed on May 11, 2018.

(52) U.S. Cl.
CPC .............. $G06T\ 2207/20021$ (2013.01); $G06T\ 2207/20104$ (2013.01); $G06T\ 2207/30061$ (2013.01); $G06T\ 2207/30101$ (2013.01); $G06T\ 2207/30172$ (2013.01)

(58) Field of Classification Search
CPC . G06T 2207/30061; G06T 2207/30101; G06T 2207/30172
See application file for complete search history.

(56) References Cited

U.S. PATENT DOCUMENTS

| | | | |
|---|---|---|---|
| 7,316,681 | B2 | 1/2008 | Madhani et al. |
| 7,772,541 | B2 | 8/2010 | Froggatt et al. |
| 8,900,131 | B2 | 12/2014 | Chopra et al. |
| 9,259,274 | B2 | 2/2016 | Prisco |
| 9,452,276 | B2 | 9/2016 | Duindam et al. |
| 2004/0047056 | A1 | 3/2004 | Sekiguchi et al. |
| 2005/0180389 | A1 | 8/2005 | Xenakis et al. |
| 2006/0013523 | A1 | 1/2006 | Childlers et al. |
| 2008/0119712 | A1 | 5/2008 | Lloyd |
| 2008/0286644 | A1 | 11/2008 | Yeo |
| 2013/0182008 | A1 | 7/2013 | Zhou et al. |
| 2014/0086464 | A1 | 3/2014 | Brockway et al. |
| 2015/0073265 | A1* | 3/2015 | Popovic ........... A61B 1/000094 600/424 |
| 2016/0022125 | A1* | 1/2016 | Nicolau ................. A61B 34/20 600/109 |
| 2017/0150975 | A1* | 6/2017 | Bozung .................. A61B 34/20 |
| 2017/0151027 | A1* | 6/2017 | Walker ................... A61B 34/37 |
| 2017/0249737 | A1 | 8/2017 | Piron et al. |
| 2017/0337682 | A1 | 11/2017 | Liao et al. |
| 2018/0333210 | A1* | 11/2018 | Nijkamp ................ A61B 6/502 |
| 2019/0066314 | A1* | 2/2019 | Abhari ....................... G06T 7/33 |
| 2019/0142524 | A1* | 5/2019 | Hladio ...................... G06T 7/30 600/249 |
| 2020/0138518 | A1* | 5/2020 | Lang .................. A61B 17/1703 |
| 2021/0007778 | A1* | 1/2021 | Shoham ................. A61B 34/32 |
| 2021/0233263 | A1 | 7/2021 | Soper et al. |
| 2025/0134555 | A1* | 5/2025 | Smith ................ A61B 17/7013 |

FOREIGN PATENT DOCUMENTS

| | | |
|---|---|---|
| CN | 109102490 A | 12/2018 |
| WO | WO-2012158324 A2 | 11/2012 |
| WO | WO-2016033596 A1 | 3/2016 |
| WO | WO-2016164311 A1 | 10/2016 |
| WO | WO-2016191296 A1 | 12/2016 |
| WO | WO-2016191298 A1 | 12/2016 |

OTHER PUBLICATIONS

G. K. L. Tam et al., "Registration of 3D Point Clouds and Meshes: A Survey from Rigid to Nonrigid," in IEEE Transactions on Visualization and Computer Graphics, vol. 19, No. 7, pp. 1199-1217, Jul. 2013, doi: 10.1109/TVCG.2012.310. (Year: 2013).

Hub M., et al., "Estimation of the Uncertainty of Elastic Image Registration With the Demons Algorithm," Physics in Medicine and Biology, May 2013, vol. 58 (9), pp. 3023-3036.

International Preliminary Report on Patentability for Application No. PCT/US2019/031039, mailed on Nov. 26, 2020, 11 pages.

International Search Report and Written Opinion for Application No. PCT/US2019/031039, mailed on Jul. 3, 2019, 12 pages.

M. Kang and K. Kim, "Automatic SAR Image Registration via Tsallis Entropy and Iterative Search Process," in IEEE Sensors Journal, Jul. 15, 2020, vol. 20, No. 14, pp. 7711-7720. doi: 10.1109/JSEN.2020.2981398.

Muenzing S.E.A., et al., "Automatic Detection of Registration Errors for Quality Assessment in Medical Image Registration," Biomedical Photonics and Optoelectronic Imaging, 2009, vol. 7259, pp. 72590K.

Salvi, J. et al., "A review of recent range image registration methods with accuracy evaluation", Image and Vision computing, May 1, 2007, vol. 25, No. 5, pp. 578-596.

Sokooti H., et al., "Accuracy Estimation for Medical Image Registration Using Regression Forests," International Conference on Computer Analysis of Images and Patterns, Oct. 2016, pp. 107-115.

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

Extended European Search Report for Application No. EP25182896.8, mailed on Jul. 29, 2025, 08 pages.

* cited by examiner

400

400

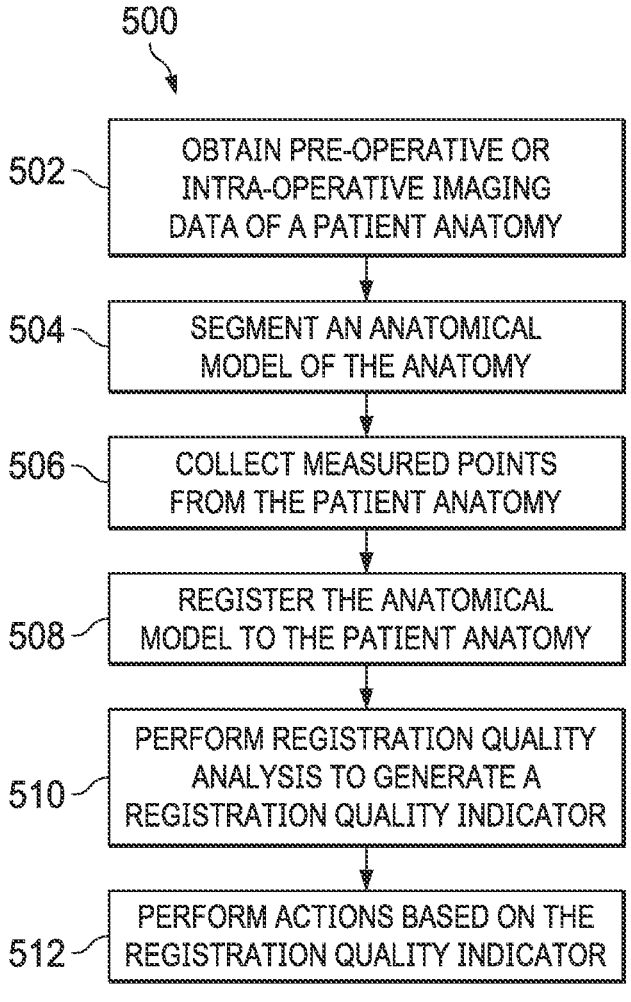

500

502 — OBTAIN PRE-OPERATIVE OR INTRA-OPERATIVE IMAGING DATA OF A PATIENT ANATOMY

504 — SEGMENT AN ANATOMICAL MODEL OF THE ANATOMY

506 — COLLECT MEASURED POINTS FROM THE PATIENT ANATOMY

508 — REGISTER THE ANATOMICAL MODEL TO THE PATIENT ANATOMY

510 — PERFORM REGISTRATION QUALITY ANALYSIS TO GENERATE A REGISTRATION QUALITY INDICATOR

512 — PERFORM ACTIONS BASED ON THE REGISTRATION QUALITY INDICATOR

Fig. 5

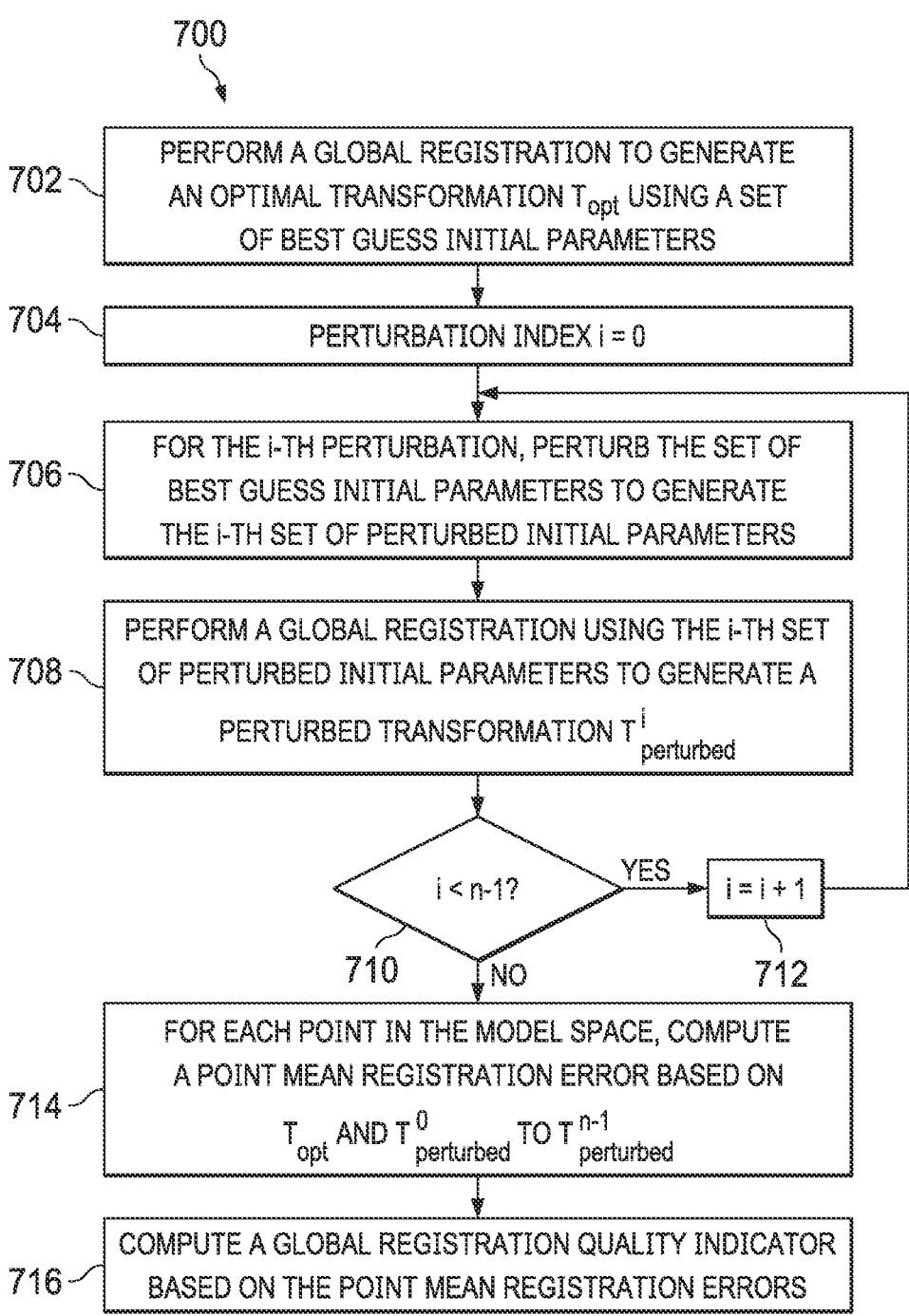

700

702 — PERFORM A GLOBAL REGISTRATION TO GENERATE AN OPTIMAL TRANSFORMATION $T_{opt}$ USING A SET OF BEST GUESS INITIAL PARAMETERS 704 — PERTURBATION INDEX $i = 0$ 706 — FOR THE i-TH PERTURBATION, PERTURB THE SET OF BEST GUESS INITIAL PARAMETERS TO GENERATE THE i-TH SET OF PERTURBED INITIAL PARAMETERS 708 — PERFORM A GLOBAL REGISTRATION USING THE i-TH SET OF PERTURBED INITIAL PARAMETERS TO GENERATE A PERTURBED TRANSFORMATION $T^i_{perturbed}$ 710 — $i < n\text{-}1?$     YES     $i = i + 1$ — 712

NO

714 — FOR EACH POINT IN THE MODEL SPACE, COMPUTE A POINT MEAN REGISTRATION ERROR BASED ON $T_{opt}$ AND $T^0_{perturbed}$ TO $T^{n-1}_{perturbed}$ 716 — COMPUTE A GLOBAL REGISTRATION QUALITY INDICATOR BASED ON THE POINT MEAN REGISTRATION ERRORS

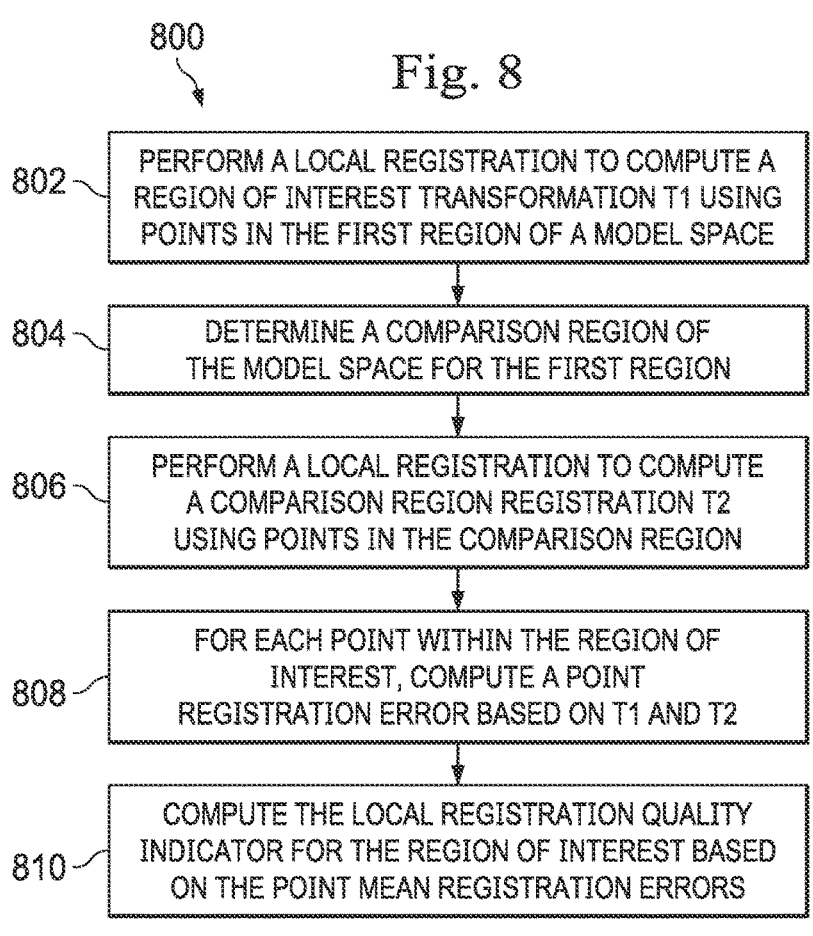

802 — PERFORM A LOCAL REGISTRATION TO COMPUTE A REGION OF INTEREST TRANSFORMATION T1 USING POINTS IN THE FIRST REGION OF A MODEL SPACE

804 — DETERMINE A COMPARISON REGION OF THE MODEL SPACE FOR THE FIRST REGION

806 — PERFORM A LOCAL REGISTRATION TO COMPUTE A COMPARISON REGION REGISTRATION T2 USING POINTS IN THE COMPARISON REGION

808 — FOR EACH POINT WITHIN THE REGION OF INTEREST, COMPUTE A POINT REGISTRATION ERROR BASED ON T1 AND T2

810 — COMPUTE THE LOCAL REGISTRATION QUALITY INDICATOR FOR THE REGION OF INTEREST BASED ON THE POINT MEAN REGISTRATION ERRORS

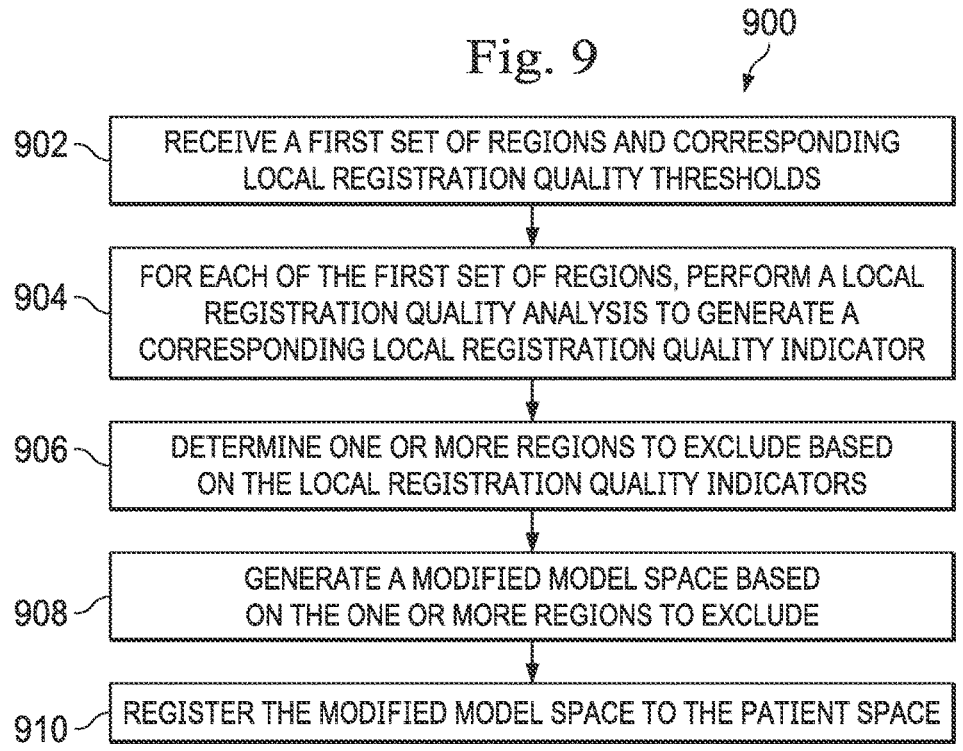

902 — RECEIVE A FIRST SET OF REGIONS AND CORRESPONDING LOCAL REGISTRATION QUALITY THRESHOLDS

904 — FOR EACH OF THE FIRST SET OF REGIONS, PERFORM A LOCAL REGISTRATION QUALITY ANALYSIS TO GENERATE A CORRESPONDING LOCAL REGISTRATION QUALITY INDICATOR

906 — DETERMINE ONE OR MORE REGIONS TO EXCLUDE BASED ON THE LOCAL REGISTRATION QUALITY INDICATORS

908 — GENERATE A MODIFIED MODEL SPACE BASED ON THE ONE OR MORE REGIONS TO EXCLUDE

910 — REGISTER THE MODIFIED MODEL SPACE TO THE PATIENT SPACE

SYSTEMS AND METHODS RELATED TO REGISTRATION FOR IMAGE GUIDED SURGERY

CROSS-REFERENCE TO RELATED APPLICATIONS

This application is a continuation of U.S. patent application Ser. No. 17/051,227, filed Oct. 28, 2020, which is the U.S. national phase of International Application No. PCT/US2019/031039, filed May 7, 2019, which designated the U.S. and claims priority to and the benefit of U.S. Provisional Application No. 62/670,530, filed May 11, 2018, all of which are incorporated by reference herein in their entirety.

FIELD

The present disclosure is directed to systems and methods for conducting an image-guided procedure, and more particularly to systems and methods for using registered real-time images and prior-time anatomic images during an image-guided procedure.

BACKGROUND

Minimally invasive medical techniques are intended to reduce the amount of tissue that is damaged during medical procedures, thereby reducing patient recovery time, discomfort, and harmful side effects. Such minimally invasive techniques may be performed through natural orifices in a patient anatomy or through one or more surgical incisions. Through these natural orifices or incisions an operator may insert minimally invasive medical instruments (including surgical, diagnostic, therapeutic, or biopsy instruments) to reach a target tissue location. To assist with reaching the target tissue location, the location and movement of the medical instruments may be correlated with pre-operative or intra-operative images of the patient anatomy. With the image-guided instruments correlated to the images, the instruments may navigate natural or surgically created passageways in anatomic systems such as the lungs, the colon, the intestines, the kidneys, the heart, the circulatory system, or the like. However, usually an operator does not have sufficient knowledge about the quality (e.g., accuracy, completeness, validity, consistency) of such correlation, which may cause uncertainty in the image-guided procedure.

Accordingly, it would be advantageous to provide improved registration for performing image-guided procedures.

SUMMARY

The embodiments of the invention are best summarized by the claims that follow the description.

In one illustrative embodiment, a method performed by a computing system includes accessing a set of model points of a model of an anatomic structure of a patient, the model points being associated with a model space, collecting a set of measured points of the anatomic structure of the patient, the measured points being associated with a patient space, and registering the set of model points to the set of measured points using a first set of initial parameters to generate a first transformation. The method further includes generating one or more sets of perturbed initial parameters based on the first set of initial parameters, performing one or more perturbed registration processes to register the set of model points to the set of measured points using the one or more sets of perturbed initial parameters respectively to generate one or more perturbed transformations; and generating a registration quality indicator based on the first transformation and the one or more perturbed transformations.

In another illustrative embodiment, a method performed by a computing system includes accessing a set of model points of a model of an anatomic structure of a patient, the model points being associated with a model space, collecting a set of measured points of the anatomic structure of the patient, the measured points being associated with a patient space, determining a region of interest in the model space, and determining a comparison region in the model space. The method further includes registering a first set of model points in the region of interest to the set of measured points to generate a first number of region of interest transformations, registering a second set of the model points in the comparison region to the set of measured points to generate a first number of comparison region transformations corresponding to the first number of region of interest transformations respectively, and generating a registration quality indicator for the region of interest based on the first number of region of interest transformations and the first number of comparison region transformations.

In another illustrative embodiment, a method performed by a computing system includes accessing a set of model points of a model of an anatomic structure of a patient, the model points being associated with a model space, collecting a set of measured points of the anatomic structure of the patient, the measured points being associated with a patient space, and registering the set of model points to the set of measured points to generate a first transformation. The method further includes performing a local registration quality analysis for a region of interest to generate a local registration quality indicator, generating a modified model space based on the registration quality indicator, and registering a subset set of model points associated with the modified model space to the set of measured points to generate a second transformation.

In another illustrative embodiment, a non-transitory machine-readable medium comprising a plurality of machine-readable instructions which, when executed by one or more processors, are adapted to cause the one or more processors to perform a method. The method includes accessing a set of model points of a model of an anatomic structure of a patient, the model points being associated with a model space, collecting a set of measured points of the anatomic structure of the patient, the measured points being associated with a patient space, and registering the set of model points to the set of measured points using a first set of initial parameters to generate a first transformation. The method further includes generating one or more sets of perturbed initial parameters based on the first set of initial parameters, performing one or more perturbed registration processes to register the set of model points to the set of measured points using the one or more sets of perturbed initial parameters respectively to generate one or more perturbed transformations, and generating a registration quality indicator based on the first transformation and the one or more perturbed transformations.

In another illustrative embodiment, a non-transitory machine-readable medium comprising a plurality of machine-readable instructions which, when executed by one or more processors, are adapted to cause the one or more processors to perform a method. The method includes accessing a set of model points of a model of an anatomic structure of a patient, the model points being associated with a model space, collecting a set of measured points of the anatomic structure of the patient, the measured points being associated with a patient space, determining a region of interest in the model space, and determining a comparison region in the model space. The method further includes registering a first set of model points in the region of interest to the set of measured points to generate a first number of region of interest transformations, registering a second set of the model points in the comparison region to the set of measured points to generate a first number of comparison region transformations corresponding to the first number of region of interest transformations respectively, and generating a registration quality indicator for the region of interest based on the first number of region of interest transformations and the first number of comparison region transformations.

In another illustrative embodiment, a non-transitory machine-readable medium comprising a plurality of machine-readable instructions which, when executed by one or more processors, are adapted to cause the one or more processors to perform a method. The method includes accessing a set of model points of a model of an anatomic structure of a patient, the model points being associated with a model space, collecting a set of measured points of the anatomic structure of the patient, the measured points being associated with a patient space, and registering the set of model points to the set of measured points to generate a first transformation. The method further includes performing a local registration quality analysis for a region of interest to generate a local registration quality indicator, generating a modified model space based on the registration quality indicator, and registering a subset set of model points associated with the modified model space to the set of measured points to generate a second transformation.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTIONS OF THE DRAWINGS

Figures 2A, 2B:
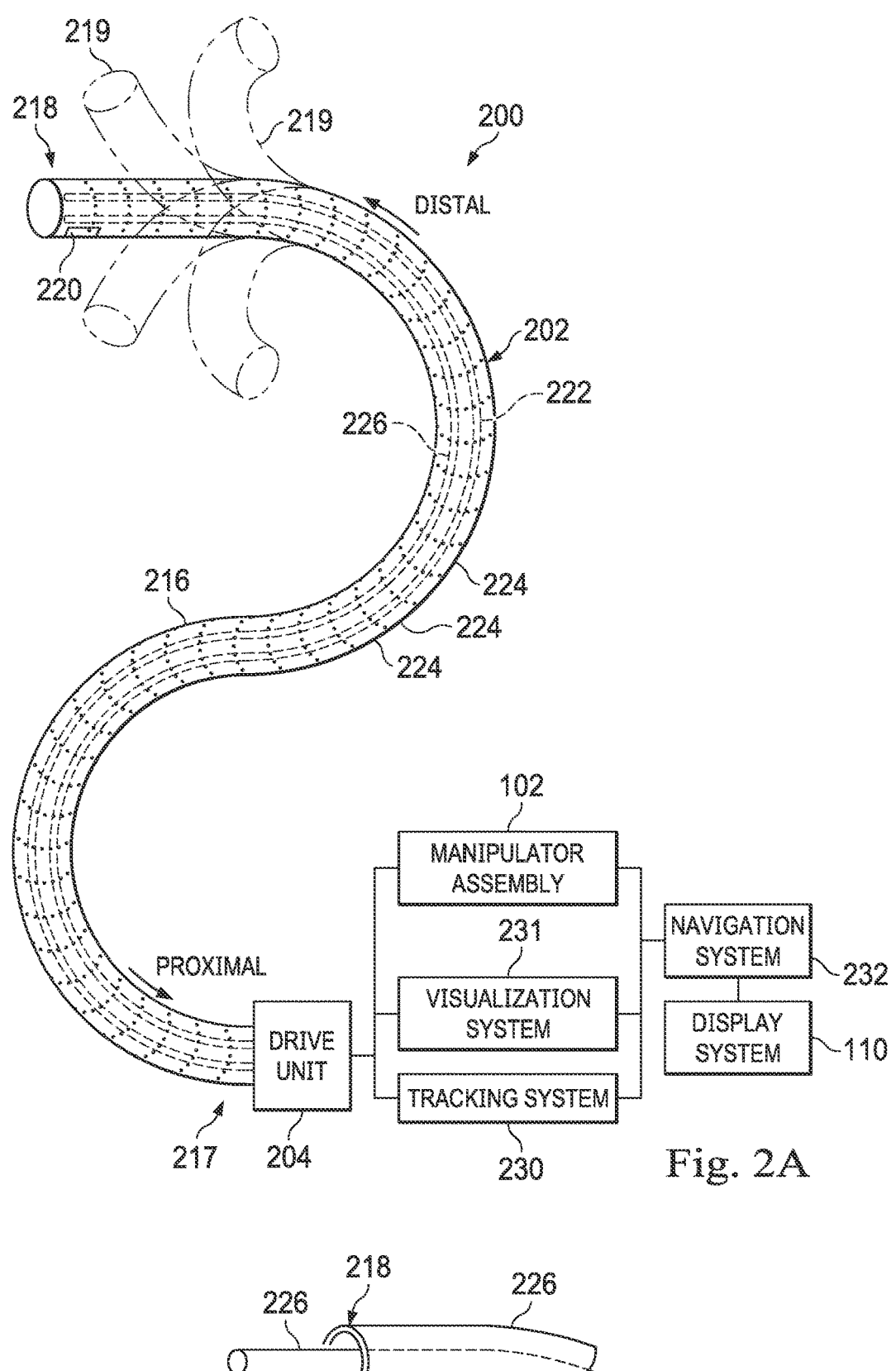
FIG. 2A is a simplified diagram of a medical instrument system according to some embodiments.
FIG. 2B is a simplified diagram of a medical instrument with an extended medical tool according to some embodiments.
Figure 3A:
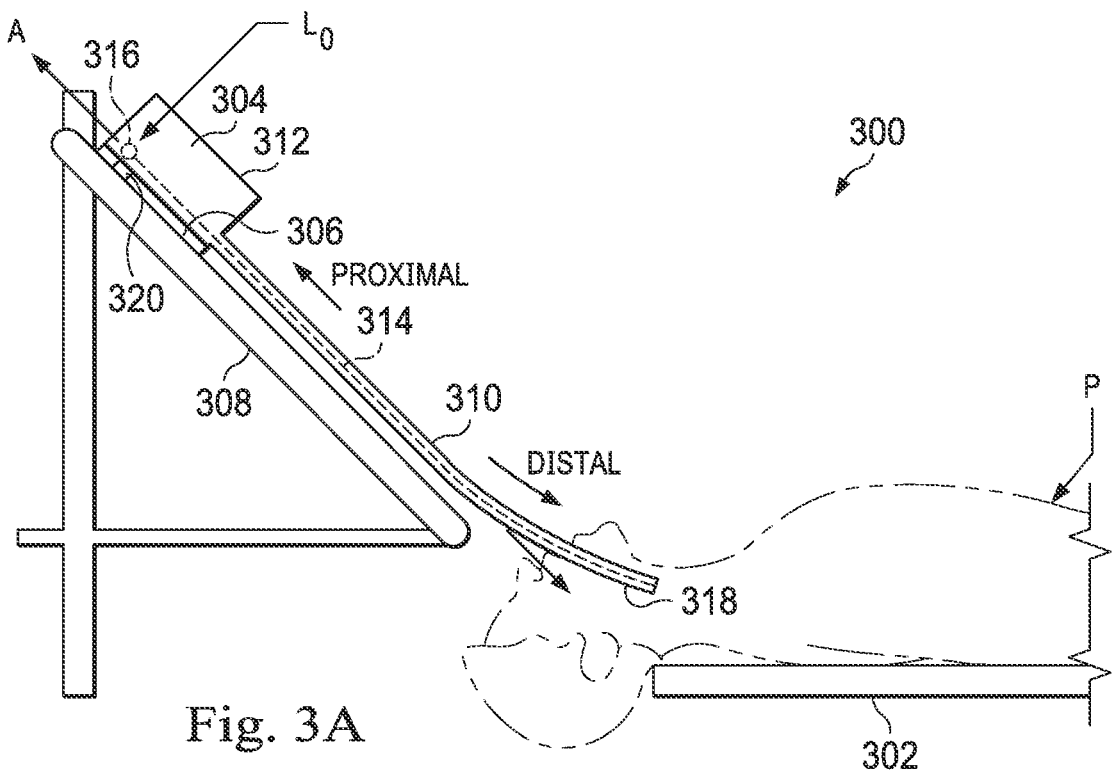
FIGS. 3A and 3B are simplified diagrams of side views of a patient coordinate space including a medical instrument mounted on an insertion assembly according to some embodiments.
Figure 3B:
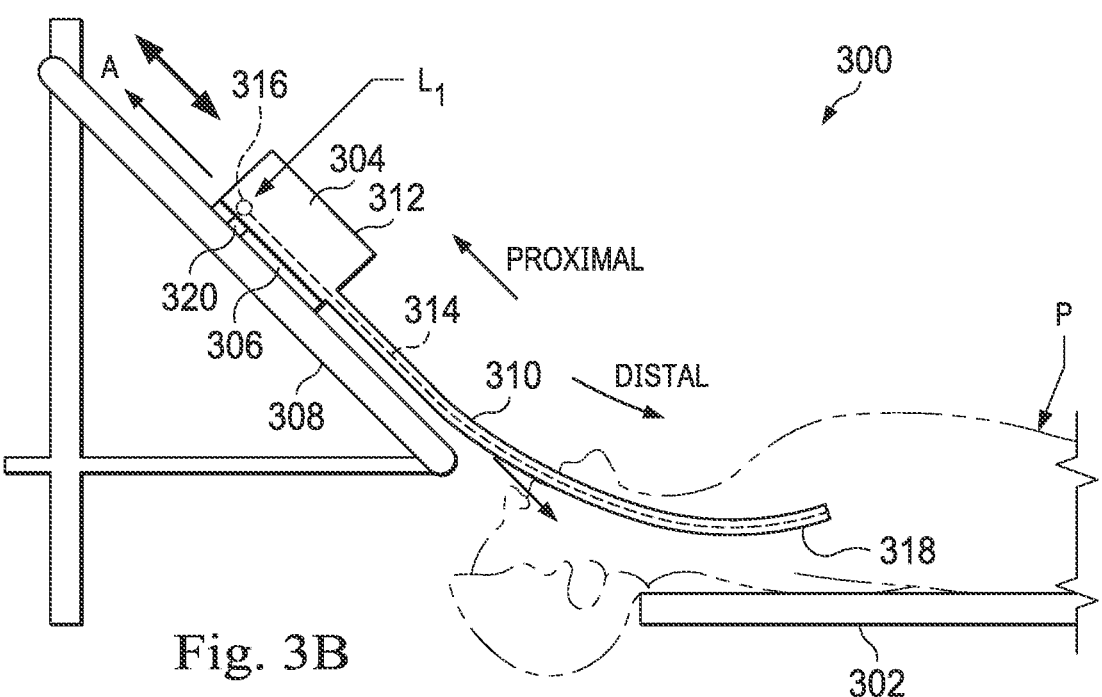
Figure 4A:
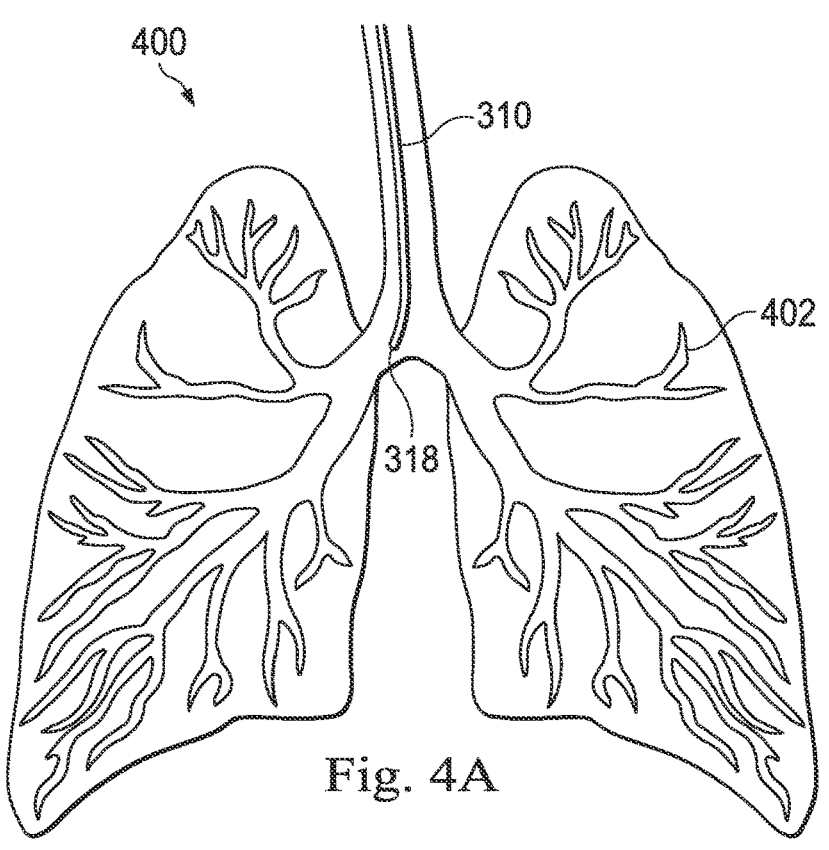
Figure 4B:
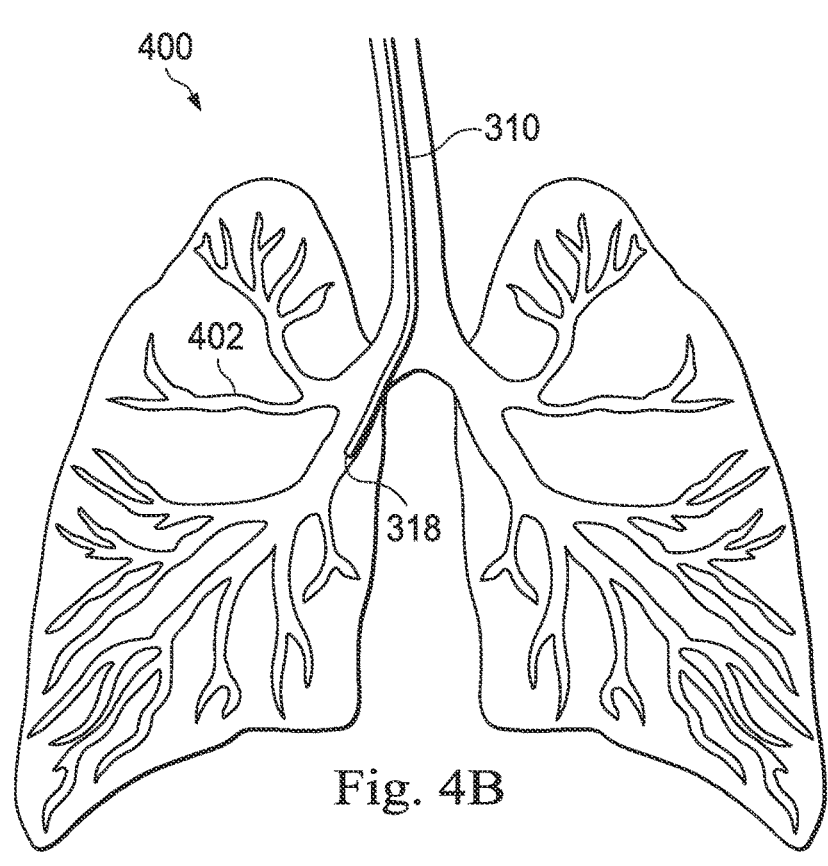
Figure 4C:
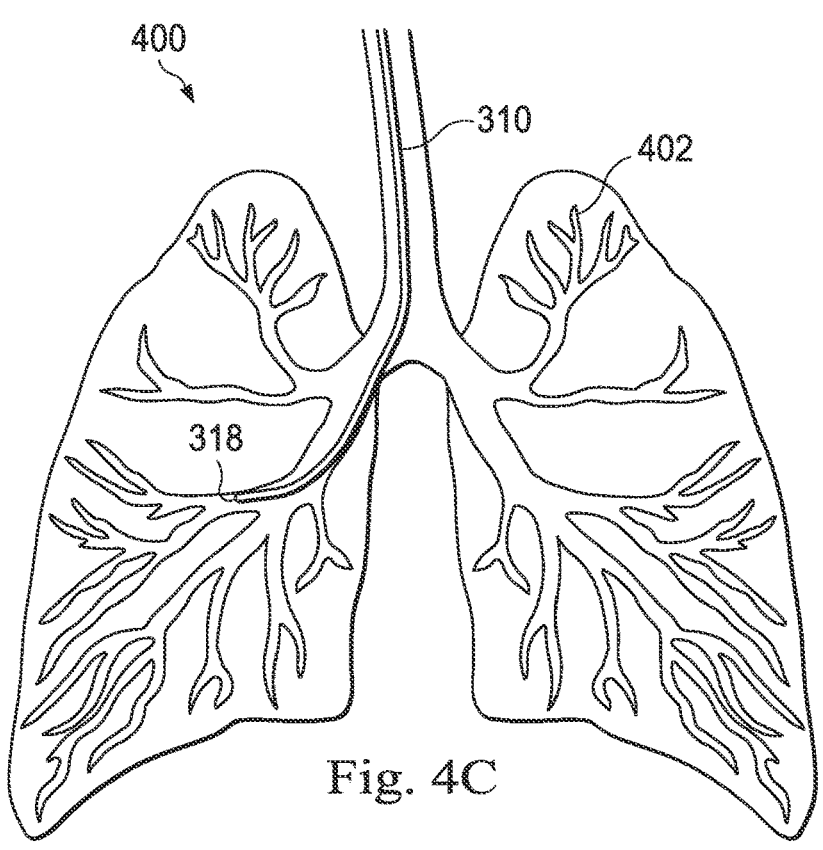
Figure 4D:
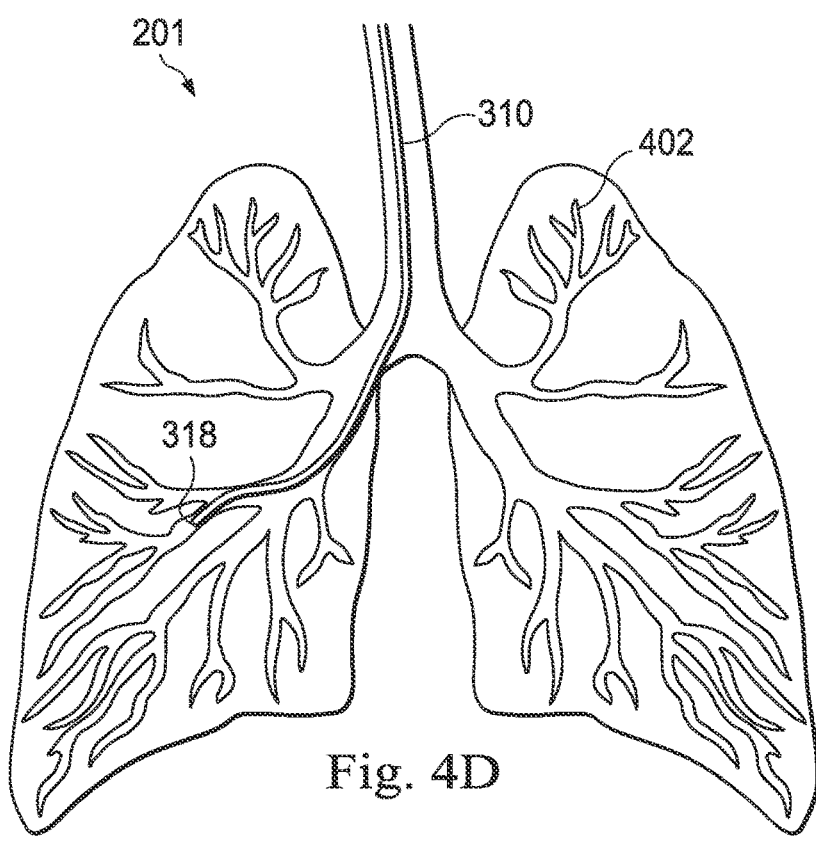

FIGS. 4A, 4B, 4C, and 4D illustrate the distal end of the medical instrument system of FIGS. 2, 3A, 3B, during insertion within a human lung according to some embodiments.

FIG. 5 is a flowchart illustrating a method of an image-guided surgical procedure or a portion thereof according to some embodiments.

Figure 6A:
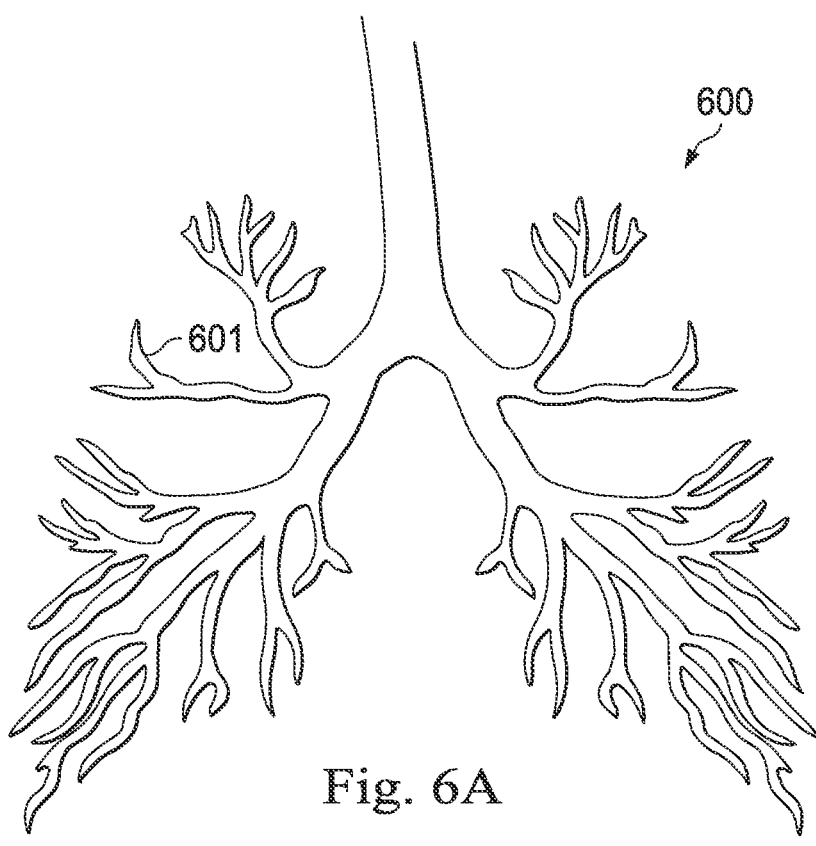
Figure 6B:
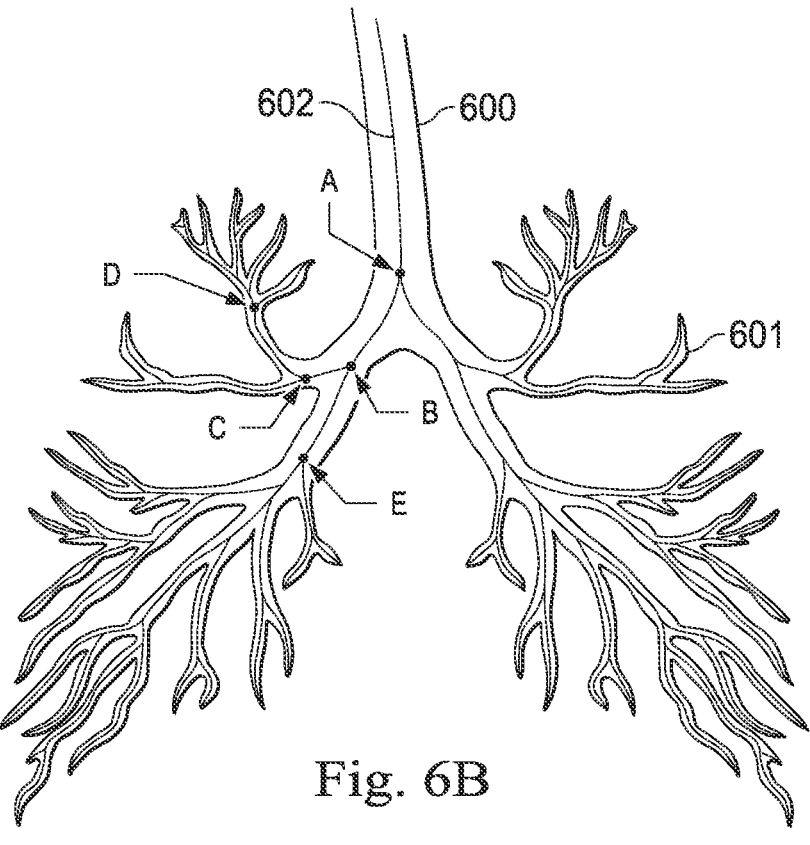
Figure 6C:
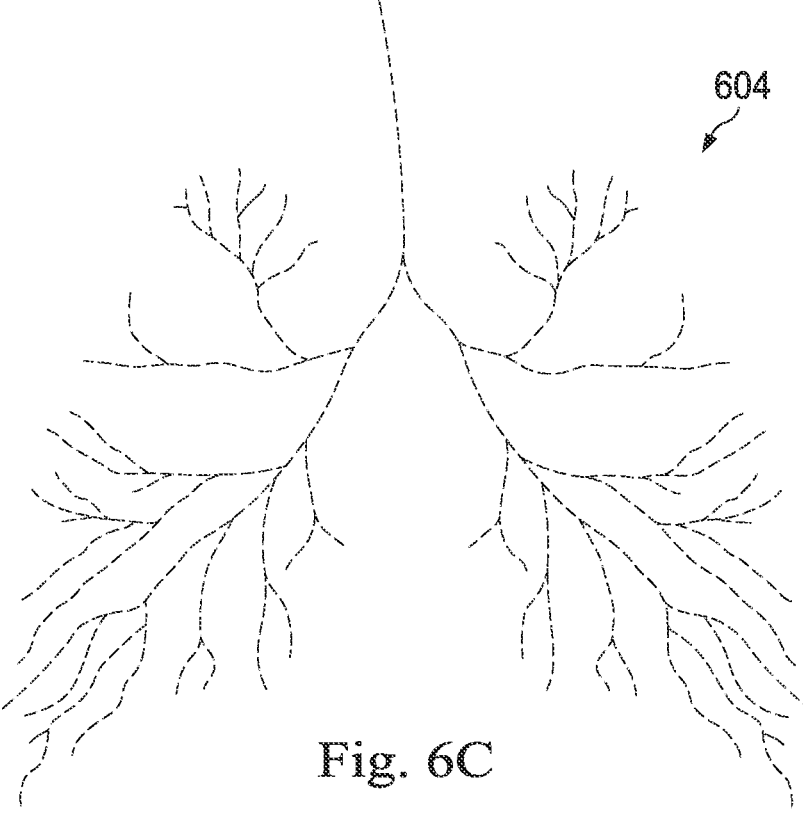

FIGS. 6A, 6B, and 6C illustrate steps in segmentation processes that generate a model of a human lung for registration according to some embodiments.

FIG. 7 is a flow chart providing a method for performing a global registration quality analysis according to some embodiments.

FIG. 8 is a flow chart providing a method for performing a local registration quality analysis according to some embodiments.

FIG. 9 is a flow chart providing a method for performing re-registration based on registration quality analysis according to some embodiments.

Figure 10:
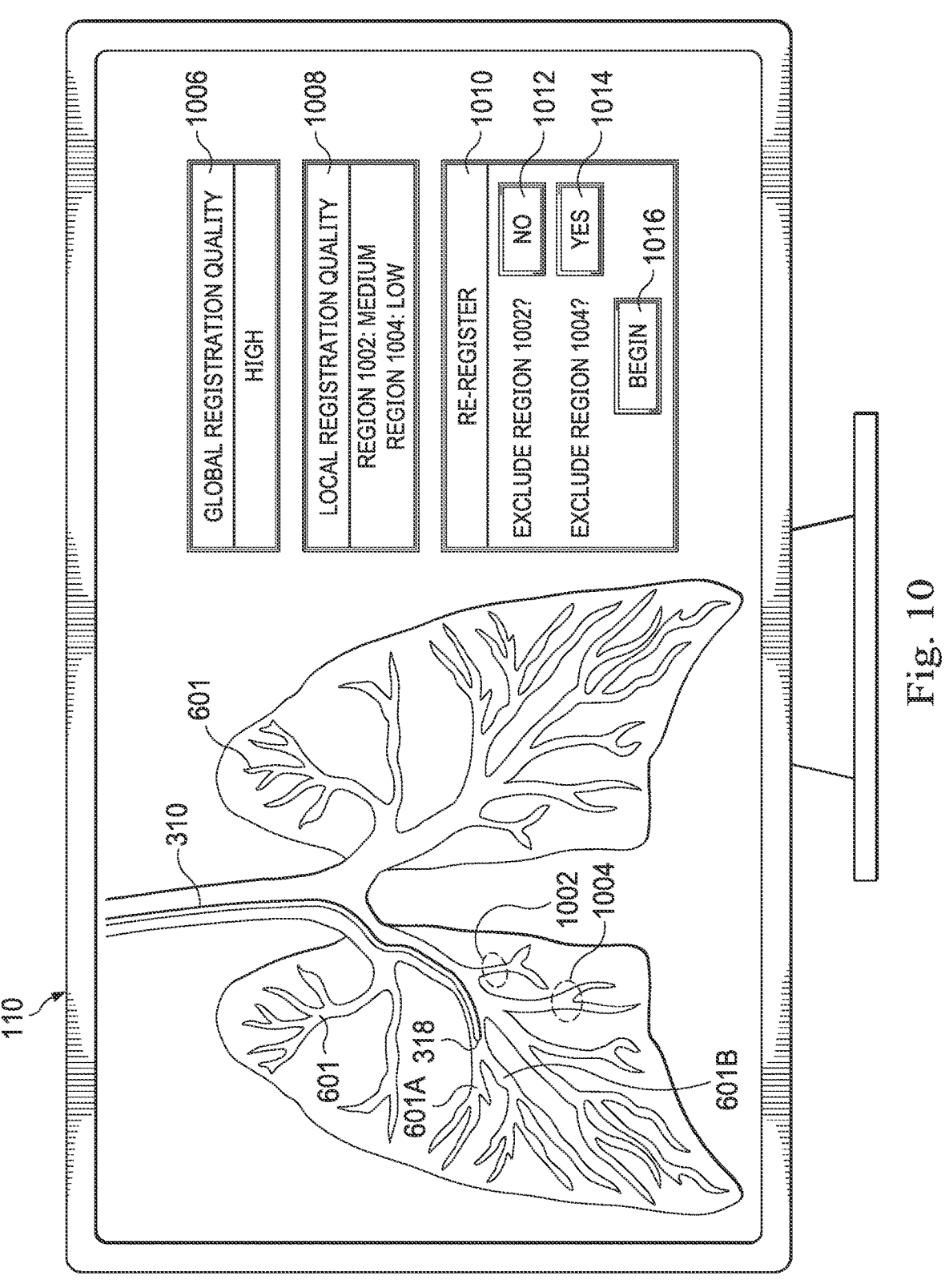

FIG. 10 illustrates a display stage of a re-registration technique according to some embodiments.

Figure 11:
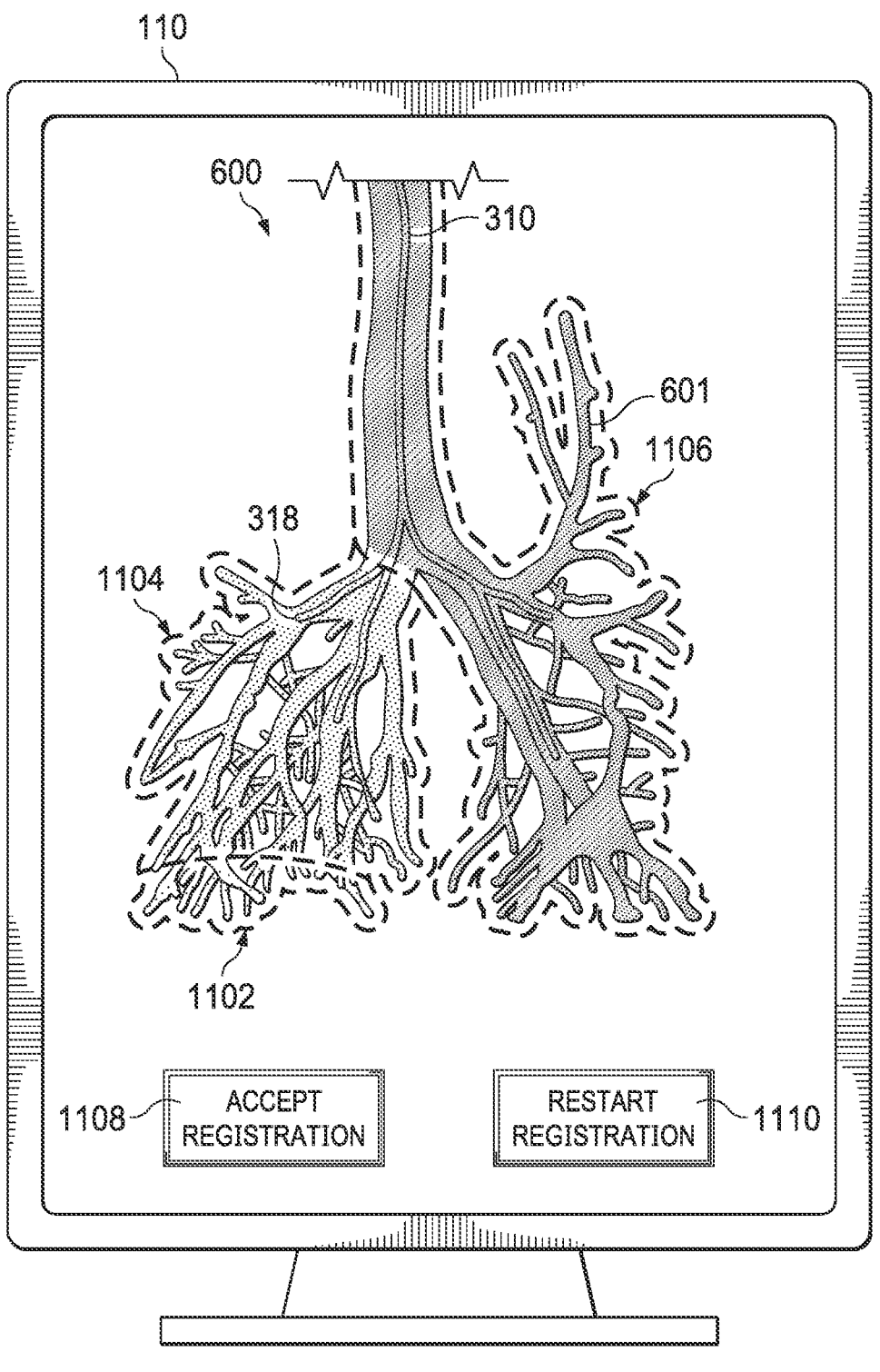

FIG. 11 illustrates a display stage of a re-registration technique according to some embodiments.

Embodiments of the present disclosure and their advantages are best understood by, referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some instances well known methods, procedures, components, and circuits have not been described in detail so as not to unnecessarily obscure aspects of the embodiments.

This disclosure describes various instruments and portions of instruments in terms of their state in three-dimensional space. As used herein, the term "position" refers to the location of an object or a portion of an object in a three-dimensional space (e.g., three degrees of translational freedom along Cartesian x-, y-, and z-coordinates). As used herein, the term "orientation" refers to the rotational placement of an object or a portion of an object (three degrees of rotational freedom—e.g., roll, pitch, and yaw). As used herein, the term "pose" refers to the position of an object or a portion of an object in at least one degree of translational freedom and to the orientation of that object or portion of the object in at least one degree of rotational freedom (up to six total degrees of freedom). As used herein, the term "shape" refers to a set of poses, positions, or orientations measured along an object.

Figure 1:
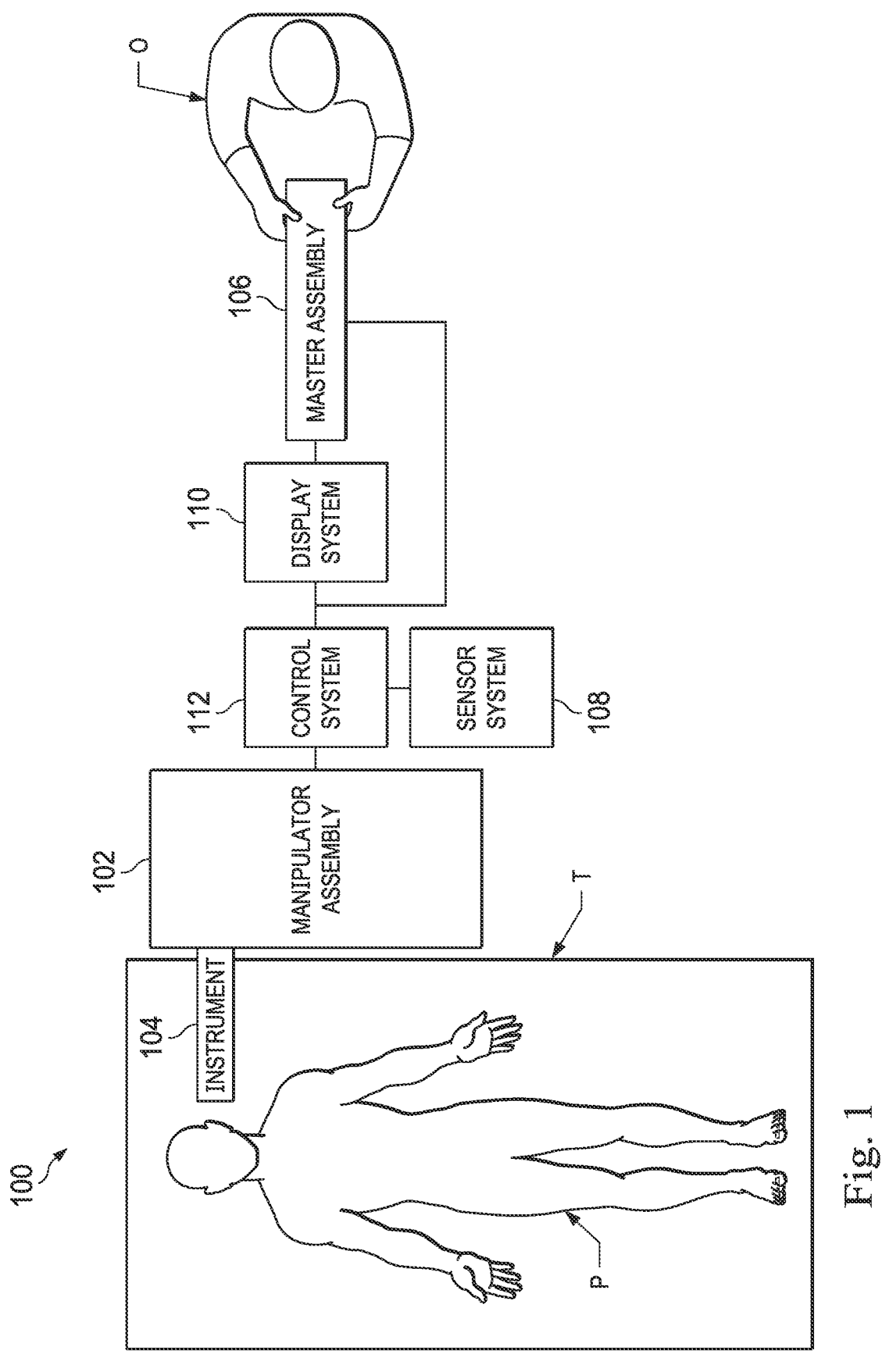
FIG. 1 is a simplified diagram of a teleoperated medical system according to some embodiments.

FIG. 1 is a simplified diagram of a teleoperated medical system 100 according to some embodiments. In some embodiments, teleoperated medical system 100 may be suitable for use in, for example, surgical, diagnostic, therapeutic, or biopsy procedures. While some embodiments are provided herein with respect to such procedures, any reference to medical or surgical instruments and medical or surgical methods is non-limiting. The systems, instruments, and methods described herein may be used for animals, human cadavers, animal cadavers, portions of human or animal anatomy, non-surgical diagnosis, as well as for industrial systems and general robotic or teleoperational systems.

As shown in FIG. 1, medical system 100 generally includes a manipulator assembly 102 for operating a medical instrument 104 in performing various procedures on a patient P. The manipulator assembly 102 may be teleoperated, non-teleoperated, or a hybrid teleoperated and non-teleoperated assembly with select degrees of freedom of motion that may be motorized and/or teleoperated and select degrees of freedom of motion that may be non-motorized and/or non-teleoperated. Manipulator assembly 102 is mounted to or near an operating table T. A master assembly 106 allows an operator (e.g., a surgeon, a clinician, or a physician as illustrated in FIG. 1) 0 to view the interventional site and to control manipulator assembly 102.

Master assembly 106 may be located at an operator console which is usually located in the same room as operating table T, such as at the side of a surgical table on which patient P is located. However, it should be understood that operator O can be located in a different room or a completely different building from patient P. Master assembly 106 generally includes one or more control devices for controlling manipulator assembly 102. The control devices may include any number of a variety of input devices, such as joysticks, trackballs, data gloves, trigger-guns, hand-operated controllers, voice recognition devices, body motion or presence sensors, and/or the like. To provide operator O a strong sense of directly controlling instruments 104 the control devices may be provided with the same degrees of freedom as the associated medical instrument 104. In this manner, the control devices provide operator O with telepresence or the perception that the control devices are integral with medical instruments 104.

In some embodiments, the control devices may have more or fewer degrees of freedom than the associated medical instrument 104 and still provide operator O with telepresence. In some embodiments, the control devices may optionally be manual input devices which move with six degrees of freedom, and which may also include an actuatable handle for actuating instruments (for example, for closing grasping jaws, applying an electrical potential to an electrode, delivering a medicinal treatment, and/or the like).

Manipulator assembly 102 supports medical instrument 104 and may include a kinematic structure of one or more non-servo controlled links (e.g., one or more links that may be manually positioned and locked in place, generally referred to as a set-up structure), and/or one or more servo controlled links (e.g. one more links that may be controlled in response to commands from the control system), and a manipulator. Manipulator assembly 102 may optionally include a plurality of actuators or motors that drive inputs on medical instrument 104 in response to commands from the control system (e.g., a control system 112). The actuators may optionally include drive systems that when coupled to medical instrument 104 may advance medical instrument 104 into a naturally or surgically created anatomic orifice. Other drive systems may move the distal end of medical instrument 104 in multiple degrees of freedom, which may include three degrees of linear motion (e.g., linear motion along the X, Y, Z Cartesian axes) and in three degrees of rotational motion (e.g., rotation about the X, Y, Z Cartesian axes), Additionally, the actuators can be used to actuate an articulable end effector of medical instrument 104 for grasping tissue in the jaws of a biopsy device and/or the like. Actuator position sensors such as resolvers, encoders, potentiometers, and other mechanisms may provide sensor data to medical system 100 describing the rotation and orientation of the motor shafts. This position sensor data may be used to determine motion of the objects manipulated by the actuators.

Teleoperated medical system 100 may include a sensor system 108 with one or more sub-systems for receiving information about the instruments of manipulator assembly 102. Such sub-systems may include a position/location sensor system (e.g., an electromagnetic (EM) sensor system); a shape sensor system for determining the position, orientation, speed, velocity, pose, and/or shape of a distal end and/or of one or more segments along a flexible body that may make up medical instrument 104; and/or a visualization system for capturing images from the distal end of medical instrument 104.

Teleoperated medical system 100 also includes a display system 110 for displaying an image or representation of the surgical site and medical instrument 104 generated by sub-systems of sensor system 108. Display system 110 and master assembly 106 may be oriented so operator O can control medical instrument 104 and master assembly 106 with the perception of telepresence.

In some embodiments, medical instrument 104 may have a visualization system (discussed in more detail below), which may include a viewing scope assembly that records a concurrent or real-time image of a surgical site and provides the image to the operator or operator O through one or more displays of medical system 100, such as one or more displays of display system 110. The concurrent image may be, for example, a two or three dimensional image captured by an endoscope positioned within the surgical site. In some embodiments, the visualization system includes endoscopic components that may be integrally or removably coupled to medical instrument 104. However in some embodiments, a separate endoscope, attached to a separate manipulator assembly may be used with medical instrument 104 to image the surgical site. The visualization system may be implemented as hardware, firmware, software or a combination thereof which interact with or are otherwise executed by one or more computer processors, which may include the processors of a control system 112.

Display system 110 may also display an image of the surgical site and medical instruments captured by the visualization system. In some examples, teleoperated medical system 100 may configure medical instrument 104 and controls of master assembly 106 such that the relative positions of the medical instruments are similar to the relative positions of the eyes and hands of operator O. In this manner operator O can manipulate medical instrument 104 and the hand control as if viewing the workspace in substantially true presence. By true presence, it is meant that the presentation of an image is a true perspective image simulating the viewpoint of a physician that is physically manipulating medical instrument 104.

In some examples, display system 110 may present images of a surgical site recorded pre-operatively or intra-operatively using image data from imaging technology such as, computed tomography (CT), magnetic resonance imaging (MRI), fluoroscopy, thermography, ultrasound, optical coherence tomography (OCT), thermal imaging, impedance imaging, laser imaging, nanotube X-ray imaging, and/or the like. The pre-operative or intra-operative image data may be presented as two-dimensional, three-dimensional, or four-dimensional (including e.g., time based or velocity based information) images and/or as images from models created from the pre-operative or intra-operative image data sets.

In some embodiments, often for purposes of imaged guided surgical procedures, display system 110 may display a virtual navigational image in which the actual location of medical instrument 104 is registered (i.e., dynamically referenced) with the preoperative or concurrent images/model. This may be done to present the operator O with a virtual image of the internal surgical site from a viewpoint of medical instrument 104. In some examples, the viewpoint may be from a tip of medical instrument 104. An image of the tip of medical instrument 104 and/or other graphical or alphanumeric indicators may be superimposed on the virtual image to assist operator O controlling medical instrument 104. In some examples, medical instrument 104 may not be visible in the virtual image.

In some embodiments, display system 110 may display a virtual navigational image in which the actual location of medical instrument 104 is registered with preoperative or concurrent images to present the operator O with a virtual image of medical instrument 104 within the surgical site from an external viewpoint. An image of a portion of medical instrument 104 or other graphical or alphanumeric indicators may be superimposed on the virtual image to assist operator O in the control of medical instrument 104. As described herein, visual representations of data points may be rendered to display system 110. For example, measured data points, moved data points, registered data points, and other data points described herein may be displayed on display system 110 in a visual representation. The data points may be visually represented in a user interface by a plurality of points or dots on display system 110 or as a rendered model, such as a mesh or wire model created based on the set of data points. In some examples, the data points may be color coded according to the data they represent. In some embodiments, a visual representation may be refreshed in display system 110 after each processing operation has been implemented to alter data points.

Teleoperated medical system 100 may also include control system 112. Control system 112 includes at least one memory and at least one computer processor (not shown) for effecting control between medical instrument 104, master assembly 106, sensor system 108, and display, system 110. Control system 112 also includes programmed instructions (e.g., a non-transitory machine-readable medium storing the instructions) to implement some or all of the methods described in accordance with aspects disclosed herein, including instructions for providing information to display system 110. While control system 112 is shown as a single block in the simplified schematic of FIG. 1, the system may include two or more data processing circuits with one portion of the processing optionally being performed on or adjacent to manipulator assembly 102, another portion of the processing being performed at master assembly 106, and/or the like. The processors of control system 112 may execute instructions comprising instruction corresponding to processes disclosed herein and described in more detail below. Any of a wide variety of centralized or distributed data processing architectures may be employed. Similarly, the programmed instructions may be implemented as a number of separate programs or subroutines, or they may be integrated into a number of other aspects of the teleoperational systems described herein. In one embodiment, control system 112 supports wireless communication protocols such as Bluetooth, IrDA, HomeRF, IEEE 802.11, DECT, and Wireless Telemetry.

In some embodiments, control system 112 may receive force and/or torque feedback from medical instrument 104. Responsive to the feedback, control system 112 may transmit signals to master assembly 106. In some examples, control system 112 may transmit signals instructing one or more actuators of manipulator assembly 102 to move medical instrument 104. Medical instrument 104 may extend into an internal surgical site within the body of patient P via openings in the body of patient P. Any suitable conventional and/or specialized actuators may be used. In some examples, the one or more actuators may be separate from, or integrated with, manipulator assembly 102. In some embodiments, the one or more actuators and manipulator assembly 102 are provided as part of a teleoperational cart positioned adjacent to patient P and operating table T.

Control system 112 may optionally further include a virtual visualization system to provide navigation assistance to operator O when controlling medical instrument 104 during an image-guided surgical procedure. Virtual navigation using the virtual visualization system may be based upon reference to an acquired preoperative or intraoperative dataset of anatomic passageways. The virtual visualization system processes images of the surgical site imaged using imaging technology such as computerized tomography (CT), magnetic resonance imaging (MRI), fluoroscopy, thermography, ultrasound, optical coherence tomography (OCT), thermal imaging, impedance imaging, laser imaging, nanotube X-ray imaging, and/or the like. Software, which may be used in combination with manual inputs, is used to convert the recorded images into segmented two dimensional or three dimensional composite representation of a partial or an entire anatomic organ or anatomic region. An image data set is associated with the composite representation. The composite representation and the image data set describe the various locations and shapes of the passageways and their connectivity. The images used to generate the composite representation may be recorded preoperatively or intra-operatively during a clinical procedure. In some embodiments, a virtual visualization system may use standard representations (i.e., not patient specific) or hybrids of a standard representation and patient specific data. The composite representation and any virtual images generated by the composite representation may represent the static posture of a deformable anatomic region during one or more phases of motion (e.g., during an inspiration/expiration cycle of a lung).

During a virtual navigation procedure, sensor system 108 may be used to compute an approximate location of medical instrument 104 with respect to the anatomy of patient P. The location can be used to produce both macro-level (external) tracking images of the anatomy of patient P and virtual internal images of the anatomy of patient P. The system may implement one or more electromagnetic (EM) sensor, fiber optic sensors, and/or other sensors to register and display a medical implement together with preoperatively recorded surgical images, such as those from a virtual visualization system. For example, PCT Publication WO 2016/191298 (published Dec. 1, 2016) (disclosing "Systems and Methods of Registration for image Guided Surgery"), which is incorporated by reference herein in its entirety, discloses such one system. Teleoperated medical system 100 may further include optional operations and support systems (not shown) such as illumination systems, steering control systems, irrigation systems, and/or suction systems. In some embodiments, teleoperated medical system 100 may include more than one manipulator assembly and/or more than one master assembly. The exact number of teleoperational manipulator assemblies will depend on the surgical procedure and the space constraints within the operating room, among other factors. Master assembly 106 may be collocated or they may be positioned in separate locations. Multiple master assemblies allow more than one operator to control one or more teleoperational manipulator assemblies in various combinations.

FIG. 2A is a simplified diagram of a medical instrument system 200 according to some embodiments. In some embodiments, medical instrument system 200 may be used as medical instrument 104 in an image-guided medical procedure performed with teleoperated medical system 100. In some examples, medical instrument system 200 may be used for non-teleoperational exploratory procedures or in procedures involving traditional manually operated medical instruments, such as endoscopy. Optionally medical instrument system 200 may be used to gather (i.e., measure) a set of data points corresponding to locations within anatomic passageways of a patient, such as patient P.

Medical instrument system 200 includes elongate device 202, such as a flexible catheter, coupled to a drive unit 204. Elongate device 202 includes a flexible body 216 having proximal end 217 and distal end or tip portion 218. In some embodiments, flexible body 216 has an approximately 3 mm outer diameter. Other flexible body outer diameters may be larger or smaller.

Medical instrument system 200 further includes a tracking system 230 for determining the position, orientation, speed, velocity, pose, and/or shape of distal end 218 and/or of one or more segments 224 along flexible body 216 using one or more sensors and/or imaging devices as described in further detail below. The entire length of flexible body 216, between distal end 218 and proximal end 217, may be effectively divided into segments 224. Tracking system 230 may optionally be implemented as hardware, firmware, software or a combination thereof which interact with or are otherwise executed by one or more computer processors, which may include the processors of control system 112 in FIG. 1.

Tracking system 230 may optionally track distal end 218 and/or one or more of the segments 224 using a shape sensor 222. Shape sensor 222 may optionally include an optical fiber aligned with flexible body 216 (e.g., provided within an interior channel (not shown) or mounted externally). In one embodiment, the optical fiber has a diameter of approximately 200 μm. In other embodiments, the dimensions may be larger or smaller. The optical fiber of shape sensor 222 forms a fiber optic bend sensor for determining the shape of flexible body 216. In one alternative, optical fibers including Fiber Bragg Gratings (FBGs) are used to provide strain measurements in structures in one or more dimensions. Various systems and methods for monitoring the shape and relative position of an optical fiber in three dimensions are described in U.S. patent application Ser. No. 11/180,389 (filed Jul. 13, 2005) (disclosing "Fiber optic position and shape sensing device and method relating thereto"); U.S. patent application Ser. No. 12/047,056 (filed on Jul. 16, 2004) (disclosing "Fiber-optic shape and relative position sensing"); and U.S. Pat. No. 6,389,187 (filed on Jun. 17, 1998) (disclosing "Optical Fibre Bend Sensor"), which are all incorporated by reference herein in their entireties. Sensors in some embodiments may employ other suitable strain sensing techniques, such as Rayleigh scattering, Raman scattering, Brillouin scattering, and Fluorescence scattering. In some embodiments, the shape of the elongate device may be determined using other techniques. For example, a history of the distal end pose of flexible body 216 can be used to reconstruct the shape of flexible body 216 over the interval of time. In some embodiments, tracking system 230 may optionally and/or additionally track distal end 218 using a position sensor system 220. Position sensor system 220 may be a component of an EM sensor system with position sensor system 220 including one or more conductive coils that may be subjected to an externally generated electromagnetic field. Each coil of the EM sensor system then produces an induced electrical signal having characteristics that depend on the position and orientation of the coil relative to the externally generated electromagnetic field. In some embodiments, position sensor system 220 may be configured and positioned to measure six degrees of freedom, e.g., three position coordinates X, Y, Z and three orientation angles indicating pitch, yaw, and roll of a base point or five degrees of freedom, e.g., three position coordinates X, Y, Z and two orientation angles indicating pitch and yaw of a base point. Further description of a position sensor system is provided in U.S. Pat. No. 6,380,732 (filed Aug. 11, 1999) (disclosing "Six-Degree of Freedom Tracking System having a Passive Transponder on the Object Being Tracked"), which is incorporated by reference herein in its entirety.

In some embodiments, tracking system 230 may alternately and/or additionally rely on historical pose, position, or orientation data stored for a known point of an instrument system along a cycle of alternating motion, such as breathing. This stored data may be used to develop shape information about flexible body 216. In some examples, a series of positional sensors (not shown), such as electromagnetic (EM) sensors similar to the sensors in position sensor 220 may be positioned along flexible body 216 and then used for shape sensing. In some examples, a history of data from one or more of these sensors taken during a procedure may be used to represent the shape of elongate device 202, particularly if an anatomic passageway is generally static.

Flexible body 216 includes a channel 221 sized and shaped to receive a medical instrument 226. FIG. 2B is a simplified diagram of flexible body 216 with medical instrument 226 extended according to some embodiments. In some embodiments, medical instrument 226 may be used for procedures such as surgery, biopsy, ablation, illumination, irrigation, or suction. Medical instrument 226 can be deployed through channel 221 of flexible body 216 and used at a target location within the anatomy. Medical instrument 226 may include, for example, image capture probes, biopsy instruments, laser ablation fibers, and/or other surgical, diagnostic, or therapeutic tools. Medical tools may include end effectors having a single working member such as a scalpel, a blunt blade, an optical fiber, an electrode, and/or the like. Other end effectors may include, for example, forceps, graspers, scissors, clip appliers, and/or the like. Other end effectors may further include electrically activated end effectors such as electrosurgical electrodes, transducers, sensors, and/or the like. In various embodiments, medical instrument 226 is a biopsy instrument, which may be used to remove sample tissue or a sampling of cells from a target anatomic location. Medical instrument 226 may be used with an image capture probe also within flexible body 216. In various embodiments, medical instrument 226 may be an image capture probe that includes a distal portion with a stereoscopic or monoscopic camera at or near distal end 218 of flexible body 216 for capturing images (including video images) that are processed by a visualization system 231 for display and/or provided to tracking system 230 to support tracking of distal end 218 and/or one or more of the segments 224. The image capture probe may include a cable coupled to the camera for transmitting the captured image data. In some examples, the image capture instrument may be a fiber-optic bundle, such as a fiberscope, that couples to visualization system 231. The image capture instrument may be single or multi-spectral, for example capturing image data in one or more of the visible, infrared, and/or ultraviolet spectrums. Alternatively, medical instrument 226 may itself be the image capture probe. Medical instrument 226 may be advanced from the opening of channel 221 to perform the procedure and then retracted back into the channel when the procedure is complete. Medical instrument 226 may be removed from proximal end 217 of flexible body 216 or from another optional instrument port (not shown) along flexible body 216.

Medical instrument 226 may additionally house cables, linkages, or other actuation controls (not shown) that extend between its proximal and distal ends to controllably the bend distal end of medical instrument 226. Steerable instruments are described in detail in U.S. Pat. No. 7,316,681 (filed on Oct. 4, 2005) (disclosing "Articulated Surgical Instrument for Performing Minimally invasive Surgery with Enhanced Dexterity and Sensitivity") and U.S. patent application Ser. No. 12/286,644 (filed Sep. 30, 2008) (disclosing "Passive Preload and Capstan Drive for Surgical Instruments"), which are incorporated by reference herein in their entireties.

Flexible body 216 may also house cables, linkages, or other steering controls (not shown) that extend between drive unit 204 and distal end 218 to controllably bend distal end 218 as shown, for example, by broken dashed line depictions 219 of distal end 218. In some examples, at least four cables are used to provide independent "up-down" steering to control a pitch of distal end 218 and "left-right" steering to control a yaw of distal end 281. Steerable elongate devices are described in detail in U.S. patent application Ser. No. 13/274,208 (filed Oct. 14, 2011) (disclosing "Catheter with Removable Vision Probe"), which is incorporated by reference herein in its entirety. In embodiments in which medical instrument system 200 is actuated by a teleoperational assembly, drive unit 204 may include drive inputs that removably couple to and receive power from drive elements, such as actuators, of the teleoperational assembly. In some embodiments, medical instrument system 200 may include gripping features, manual actuators, or other components for manually controlling the motion of medical instrument system 200. Elongate device 202 may be steerable or, alternatively, the system may be non-steerable with no integrated mechanism for operator control of the bending of distal end 218. In some examples, one or more lumens, through which medical instruments can be deployed and used at a target surgical location, are defined in the walls of flexible body 216.

In some embodiments, medical instrument system 200 may include a flexible bronchial instrument, such as a bronchoscope or bronchial catheter, for use in examination, diagnosis, biopsy, or treatment of a lung. Medical instrument system 200 is also suited for navigation and treatment of other tissues, via natural or surgically created connected passageways, in any of a variety of anatomic systems, including the colon, the intestines, the kidneys and kidney calices, the brain, the heart, the circulatory system including vasculature, and/or the like.

The information from tracking system 230 may be sent to a navigation system 232 where it is combined with information from visualization system 231 and/or the preoperatively obtained models to provide the physician or other operator with real-time position information. In some examples, the real-time position information may be displayed on display system 110 of FIG. 1 for use in the control of medical instrument system 200. In some examples, control system 116 of FIG. 1 may utilize the position information as feedback for positioning medical instrument system 200. Various systems for using fiber optic sensors to register and display a surgical instrument with surgical images are provided in U.S. patent application Ser. No. 13/107,562, filed May 13, 2011, disclosing, "Medical System Providing Dynamic Registration of a Model of an Anatomic Structure for Image-Guided Surgery," PCT Publication WO 2016/1033596 (filed May 20, 2016) (disclosing "Systems and Methods of Registration for Image Guided Surgery"), and PCT Publication WO 2016/164311 (filed. Apr. 4, 2016) (disclosing "Systems and Methods of Registration Compensation in Image Guided Surgery"), which are incorporated by reference herein in their entirety.

In some examples, medical instrument system 200 may be teleoperated within medical system 100 of FIG. 1. In some embodiments, manipulator assembly 102 of FIG. 1 may be replaced by direct operator control. In some examples, the direct operator control may include various handles and operator interfaces for hand-held operation of the instrument.

FIGS. 3A and 3B are simplified diagrams of side views of a patient coordinate space including a medical instrument mounted on an insertion assembly according to some embodiments. As shown in FIGS. 3A and 3B, a surgical environment 300 includes a patient P is positioned on the table T of FIG. 1. Patient may be stationary within the surgical environment in the sense that gross patient movement is limited by sedation, restraint, and/or other means. Cyclic anatomic motion including respiration and cardiac motion of patient P may continue, unless patient is asked to hold his or her breath to temporarily suspend respiratory motion. Accordingly, in some embodiments, data may be gathered at a specific, phase in respiration, and tagged and identified with that phase. In some embodiments, the phase during which data is collected may be inferred from physiological information collected from patient P. Within surgical environment 300, a point gathering instrument 304 is coupled to an instrument carriage 306. In some embodiments, point gathering instrument 304 may use EM sensors, shape-sensors, and/or other sensor modalities. Instrument carriage 306 is mounted to an insertion stage 308 fixed within surgical environment 300. Alternatively, insertion stage 308 may be movable but have a known location (e.g., via a tracking sensor or other tracking device) within surgical environment 300. Instrument carriage 306 may be a component of a manipulator assembly (e.g., manipulator assembly 102) that couples to point gathering instrument 304 to control insertion motion (i.e., motion along the A axis) and, optionally, motion of a distal end 318 of an elongate device 310 in multiple directions including yaw, pitch, and roll. Instrument carriage 306 or insertion stage 308 may include actuators, such as servomotors, (not shown) that control motion of instrument carriage 306 along insertion stage 308.

Elongate device 310 is coupled to an instrument body 312. Instrument body 312 is coupled and fixed relative to instrument carriage 306. In some embodiments, an optical fiber shape sensor 314 is fixed at a proximal point 316 on instrument body 312. In some embodiments, proximal point 316 of optical fiber shape sensor 314 may be movable along with instrument body 312 but the location of proximal point 316 may be known (e.g., via a tracking sensor or other (racking device). Shape sensor 314 measures a shape from proximal point 316 to another point such as distal end 318 of elongate device 310. Point gathering instrument 304 may be substantially similar to medical instrument system 200.

A position measuring device 320 provides information about the position of instrument body 312 as it moves on insertion stage 308 along an insertion axis A. Position measuring device 320 may include resolvers, encoders, potentiometers, and/or other sensors that determine the rotation and/or orientation of the actuators controlling the motion of instrument carriage 306 and consequently the motion of instrument body 312. In some embodiments, insertion stage 308 is ear. In some embodiments, insertion stage 308 may be curved or have a combination of curved and linear sections.

FIG. 3A shows instrument body 312 and instrument carriage 306 in a retracted position along insertion stage 308. In this retracted position, proximal point 316 is at a position $L_0$ on axis A. In this position along insertion stage 308 an A component of the location of proximal point 316 may be set to a zero and/or another reference value to provide a base reference to describe the position of instrument carriage 306, and thus proximal point 316, on insertion stage 308. With this retracted position of instrument body 312 and instrument carriage 306, distal end 318 of elongate device 310 may be positioned just inside an entry orifice of patient P. Also in this position, position measuring device 320 may be set to a zero and/or the another reference value (e.g., I=0). In FIG. 3B, instrument body 312 and instrument carriage 306 have advanced along the linear track of insertion stage 308 and distal end 318 of elongate device 310 has advanced into patient P. In this advanced position, the proximal point 316 is at a position $L_1$ on the axis A. In some examples, encoder and/or other position data from one or more actuators controlling movement of instrument carriage 306 along insertion stage 308 and/or one or more position sensors associated with instrument carriage 306 and/or insertion stage 308 is used to determine the position $L_x$ of proximal point 316 relative to position $L_0$. In some examples, position $L_x$ may further be used as an indicator of the distance or insertion depth to which distal end 318 of elongate device 310 is inserted into the passageways of the anatomy of patient P.

FIGS. 4A, 4B, 4C, and 4D illustrate the advancement of elongate device 310 of FIGS. 3A and 3B through anatomic passageways 402 of the lungs 400 of the patient P of FIGS. 1 and 3A and 3B. These passageways 402 include the trachea and the bronchial tubes. As the elongate device 310 is advanced with the carriage 306 moving along the insertion stage 308, the operator O may steer the distal end 318 of elongate device 310 to navigate through the anatomic passageways 402. In navigating through the anatomic passageways 402, elongate device 310 assumes a shape that may be measured by the shape sensor 314 extending within the elongate device 310.

Referring to FIGS. 5, 6A, GB, 6C, 7, 8, 9, 10, and 11, various embodiments for image-guided surgical procedure using registration quality analysis are described. FIG. 5 is a flowchart illustrating a general method 500 for use in an image-guided surgical procedure. FIGS. 6A, 6B, and 6C illustrate segmentation processes of the general method 500 that generates a model of a human lung for registration. FIGS. 7 and 8 are flow charts illustrating global registration quality analysis and local registration quality analysis respectively. FIGS. 9 and 10 illustrate a method for performing registration based the registration quality analysis. FIG. 11 illustrates a visual representation of the registration quality indictor. As discussed in detail below, in an example, providing registration quality indicators to an operator help the operator to better understand the uncertainty in the registration, which may further help the operator's navigation operation. In another example, various actions (e.g., by an operator or a control system) may be performed based on the registration quality indicators, which may improve the quality of the image-guided procedure. In yet another example, registration quality analysis may be performed for the entire model space or particular regions of interest where registration quality is of more importance to an operator.

FIG. 5 is a flowchart illustrating a general method 500 for use in an image-guided surgical procedure. The method 500 is illustrated in FIG. 5 as a set of operations or processes 502 through 512. Not all of the illustrated processes 502 through 512 may be performed in all embodiments of method 500. Additionally, one or more processes that are not expressly illustrated in FIG. 5 may be included before, after, in between, or as part of the processes 502 through 512. In some embodiments, one or more of the processes may be implemented, at least in part, in the form of executable code stored on non-transitory, tangible, machine-readable media that when run by one or more processors (e.g., the processors of control system 112) may cause the one or more processors to perform one or more of the processes.

At a process 502, pre-operative or intra-operative image data is obtained from imaging technology such as, computed tomography (CT), magnetic resonance imaging (MRI), fluoroscopy, thermography, ultrasound, optical coherence tomography (OCT), thermal imaging, impedance imaging, laser imaging, or nanotube X-ray imaging. The pre-operative or intra-operative image data may correspond to two-dimensional, three-dimensional, or four-dimensional (including e.g., time based or velocity based information) images. For example, the image data may represent the human lungs 400 of FIGS. 4A-4D.

At a process 504, a computer system either operating alone or in combination with manual input is used to convert the recorded images into a segmented two-dimensional or three-dimensional composite representation or model of a partial or an entire anatomic organ or anatomic region. For example, FIG. 6A illustrates a segmented model 600 of the lungs 400 of FIGS. 4A-4D. Due to limitations in either the data or segmentation algorithm, the segmented model 600 may not include all of the passageways of interest present within the human lungs, but includes some passageways 601. For example, relatively narrow and/or distal passageways of the lungs may not be fully included in the segmented model 600. The segmented model 600 may be a three-dimensional model, such as a mesh model, linkage model, or another suitable model defining the interior lumens or passageways of the lungs. In general, the model serves as a spatial template of the airway geometry within the pre-operative or intra-operative reference frame. The composite representation and the image data set describe the various locations and shapes of the passageways and their connectivity and may omit undesired portions of the anatomy included in the pre-operative or intra-operative image data. In some embodiments, the model 600 may include specifically desired features, such as a suspected tumor, lesion, or other tissue portion of interest.

During the segmentation process the images are partitioned into segments or elements (e.g., pixels or voxels) that share certain characteristics or computed properties such as color, density, intensity, and texture. This segmentation process results in a two- or three-dimensional reconstruction that forms a model of the target anatomy based on the obtained image, like the model 600. To represent the model, the segmentation process may delineate sets of voxels representing the target anatomy and then apply a function, such as marching cube function, to generate a 3D surface that encloses the voxels. The model may be made by generating a mesh, volume, or voxel map. This model may be shown in the display 110 to aid the operator O in visualizing the anatomy, such as the interior passageways of the lungs.

Additionally or alternatively, the model may include a centerline model that includes a set of interconnected line segments or points extending through the centers of the modeled passageways. FIG. 6B shows an exemplary centerline model 602 derived from the model 600 or directly from the imaging data. The centerline segmented model 602 may include a set of three-dimensional straight lines or a set of curved lines that correspond to the approximate center of the passageways contained in the segmented model 602. The higher the resolution of the model, the more accurately the set of straight or curved lines will correspond to the center of the passageways. Representing the lungs with the centerline segmented model 602 may provide a smaller set of data that is more efficiently processed by one or more processors or processing cores than the data set of the segmented model 602, which represents the walls of the passageways of model 600. In this way the functioning of the control system 112 may be improved.

As shown in FIG. 6B, the centerline segmented model 602 includes several branch points, some of which are highlighted for visibility in FIG. 6B. The branch points A, B, C, D, and E are shown at each of several of the branch points. The branch point A may represent the point in the model at which the trachea divides into the left and right principal bronchi. The right principal bronchus may be identified in the centerline segment model 602 as being located between branch points A and B. Similarly, secondary bronchi are identified by the branch points B and C and between the branch points B and E. Another generation may be defined between branch points C and D. Each of these generations may be associated with a representation of the diameter of the lumen of the corresponding passageway. In some embodiments, the model 602 may include an average diameter value of each segmented generation. The average diameter value may be a patient-specific value or a more general value derived from multiple patients.

Where the model includes a centerline model including a set of interconnected line segments, those line segments may be converted to a cloud or set of points 604, referred to as model points, which are represented by the dashed lines of FIG. 6C, By converting the line segments into points, a desired quantity of model points corresponding to the interconnected line segments can be selected manually or automatically to represent the centerline model 602. (and thereby the model 600) during a registration process. In data, each of the points of the set of model points 604 may include coordinates such as a set of $X_M$, $Y_M$, and $Z_M$, coordinates, or other coordinates that identify the location of each point in the three-dimensional model space. In some embodiments, each of the points may include a generation identifier that identifies which passageway generation the points are associated with and/or a diameter or radius value associated with that portion of the centerline segmented model 602. In some embodiments, information describing the radius or diameter associated with a given point may be provided as part of a separate data set.

After the centerline segmented model 602 is generated and stored in data as the set of points 604 shown in FIG. 6C, the model points 604 may be retrieved from data storage for use in an image-guided surgical procedure. In order to use the centerline segmented model 602 and the model 600 in the image-guided surgical procedure, the model points 604 may be registered to associate the modeled passageways in the model 600 with the patient's actual anatomy as present in a surgical environment.

Returning to FIG. 5, at a process 506, measured points may be obtained from patient anatomy that correspond to the anatomical model, as described with reference to FIGS. 3A-B and 4A-D. Measured points may be generated by advancing an elongate device through anatomy and/or to landmarks in the anatomy, while measuring the position of a distal end of the elongate device or pose of the elongate device using a sensor system (e.g., the sensor system 108). The measured points are associated with a patient, space, and may also be referred to as patient, space points.

At a process 508, the anatomic model data of a model space is registered to the patient anatomy of a patient space (or vice versa) prior to and/or during the course of an image-guided surgical procedure on the patient. Generally, registration involves the matching of measured point to model points of the model through the use of rigid and/or non-rigid transforms. A point set registration method (e.g., iterative closest point (ICP) technique) may also be used in registration processes within the scope of this disclosure. Such a point set registration method may generate a transformation that aligns the measured points (also referred to as a measured point set) and the model points (also referred to as a model point set).

In various embodiments, the quality of the registration may depend on various factors, including for example, the numbers of the measured points and/or model points, the density of the measured points and/or model points, the distribution of the measured points and/or model points relative to a region of interest, measurement errors associated with the measured points and/or model points, and deformation of the patient anatomy associated with the measured points and/or model points.

At a process 510, a registration quality analysis may be performed to generate a registration quality indicator for the registration performed at the process 508. Such a registration quality indicator may be provided to the operator (e.g., using a display system 110), which may provide an operator a degree of confidence in the registration quality. In an example where the registration quality indicator indicates that the registration quality is high (e.g., based on a high quality threshold), such a registration quality indicator may bolster the operator's confidence in the image-guided surgical procedure. In an example where the registration quality indicator indicates that the registration quality is low (e.g., based on a low quality threshold), such a registration quality indicator communicates uncertainty (e.g., dubious alignment or erroneous alignment) to the operator.

At a process 512, various actions may be performed based on the registration quality indicator. For example, when the registration quality indicator indicates that the registration quality is low (e.g., based on a low quality threshold), instructions may be provided to the operator (e.g., using the display system 110) for taking necessary precautions such as cease advancing the elongate device. In another example, when the registration quality indicator indicates that the registration quality is low, the operator may be directed to use additional/alternative navigational aids (e.g. fluoroscopy or intra-operative CT). In yet another example, when the registration quality indicator indicates that the registration quality is low, a registration at process 508 may be performed again to improve registration quality or the operator may be instructed to perform the registration process again.

Referring to FIGS. 7, and 8, the process for registration quality analysis (e.g., process 510 of FIG. 5) may include a global registration quality analysis, a local registration quality analysis, and/or a combination thereof. FIG. 7 illustrates a method 700 for global registration quality analysis, and FIG. 8 illustrates a method 800 for local registration quality analysis.

Referring to FIG. 7, the method 700 in FIG. 7 is illustrated as a set of operations or processes 702 through 716. Not all of the illustrated processes 702 through 716 may be performed in all embodiments of method 700. Additionally, one or more processes that are not expressly illustrated in FIG. 7 may be included before, after, in between, or as part of the processes 702 through 716. In some embodiments, one or more of the processes may be implemented, at least in part, in the form of executable code stored on non-transitory, tangible, machine-readable media that when run by one or more processors (e.g., the processors of control system 112) may cause the one or more processors to perform one or more of the processes.

The method 700 begins at a process 702, where a global registration is performed to register the model space to the patient space. The global registration may generate an optimal transformation $T_{opt}$ for aligning the model point set of the model space and the measured point set of the patient space. In such a global registration, a registration algorithm (e.g., a point set registration algorithm) may be used to register all the points in both the measured point set and the model point set in a global registration, an optimal transformation $T_{opt}$ is computed from both the points inside and outside such particular regions of interest. It is noted that in some examples, the optimal transformation $T_{opt}$ is a solution computed based on an optimal set of input parameters, which may be different from the absolute or true optimal solution.

In some embodiments, at process 702, a registration algorithm for the global registration may use a set of optimal initial parameters (e.g. best guess initial parameters, initial parameters generated based on parameterization) for generating the optimal transformation T. The initial parameters may include a transformation seed or, a weighting scheme applied to either the model or collected points, a point correspondence configuration (e.g., soft correspondence, hard correspondence), and/or other suitable initial parameters. In some embodiments, the process 702 is skipped. In such embodiments, a transformation provided by process 508 of FIG. 5 may be used as the transformation $T_{opt}$, and the initial parameters for the registration performed at process 508 may be used as the optimal initial parameters.

The method 700 continues to a process 704, where a perturbation index i is initialized to zero. The method 700 may then continue to a process 706, where the set of optimal input parameters for generating the optimal transformation $T_{opt}$ is perturbed to generate the set of perturbed input parameters. One or more of the parameters in the set of optimal input parameters, e.g., the transformation seed, the point weighting scheme, the correspondence configuration, may be perturbed slightly to generate the $i^{th}$ set of perturbed initial parameters.

The method 700 may then proceed to the process 708, where a global registration is performed using the $i^{th}$ set of perturbed initial parameters to generate a perturbed transformation $$T^i_{perturbed}.$$

In an example, in the process 708, a registration algorithm (e.g., a point set registration algorithm) is restarted to generate the perturbed transformation $$T^i_{perturbed}$$

using the $i^{th}$ set of perturbed initial parameters.

The method 700 may then proceed to a process 710, where it is determined whether perturbation index i is less than n-1, where n is a predetermined total perturbation number. The total perturbation number n may be an integer having a value equal to or greater than one. In some embodiments, the total perturbation number n and the modification value for each initial parameter may be configured such that a distribution of registration transformations $$T^0_{perturbed}$$

through $$T^{n-1}_{perturbed}$$

generated by the n perturbations is representative of uncertainty in the optimal transformation $T_{opt}$.

In various embodiments, n sets of perturbed initial parameters are generated for the n perturbations respectively. The n sets of perturbed initial parameters are generated by modifying the optimal initial parameters such that those perturbed initial parameters cover an expected range of initial parameter values. In an example, the n sets of perturbed initial parameters include random initial parameters values within that expected range of initial parameter values. The registration seed transform may be perturbed. In another example airway registration), a perturbation (e.g. a perturbation of up to 2 cm and 30 degrees) might be applied to the initial transform. The magnitude: of the perturbation maybe determined to have a value that is sufficiently large such that it is reflects the uncertainty in the initial guess and is sufficiently small so that solutions that are outrageous or outside the scope of reality are avoided. In another embodiment the weighting of model or collected points may be adjusted either randomly or in association with a spatial distribution. For example, the point weighting may be perturbed to favor points in one side of the lung over another side of the lung, or to favor points in a given lobe over another lobe. In another embodiment, the algorithm parameters may be altered such that correspondences are computed differently or weighted differently. In an example, by using a particular set of algorithm parameters, registration may be driven heavily by point correspondences that are poorly matched (e.g. points that do not align well). In another example, by using another particular set of algorithm parameters, point correspondences with large errors might be down-weighted or ignored altogether.

In some embodiments, in the process 710, it is determined that the perturbation index i is less than n-1. In those embodiments, the method 700 proceeds to a process 712 to increase the perturbation index i by one. The method 700 may then proceed to the processes 706 and 708 to compute the next perturbed transformation $$T^i_{perturbed}$$

with the $i^{th}$ set of perturbed initial parameters.

In some embodiments, at the process 710, it is determined that the perturbation index i is not less than n−1. In those embodiments, the method 700 proceeds to a process 714, where for each point $y^k$ of a set of points in the model space, a point mean registration error $E^k$ is computed as follows:

$$E^k = \frac{1}{n} \sum_{i=0}^{n-1} \left\| y^k - T^i_{perturbed} T^{-1}_{opt} y^k \right\|, \tag{1}$$

where k is a point index, i is a perturbation index, and n is the total number of perturbations. In various embodiments, the error $E^k$ may be computed in any other ways to measure the back projection error given slightly different estimates of a rigid transformation $T_{opt}$ and $T_{perturbed}$ The model point $y^k$ may be populated from various sets of points, including for example, all points used in the model, points within a region of interest, points within some grid spaced equally within the entire volume, any other suitable set of points, and/or a combination thereof.

In some embodiments, the point mean registration error is computed for each measured point of a set of measured points in the patient space. In an example, by computing the point mean registration errors for the measured points in the patient space, the registration quality indictor may be computed to indicate uncertainty related to the path that an operator drives the elongate device 202.

The method 700 may then proceed to a process 716, where a global registration quality index (GRQI) is computed based on the point mean registration errors $E^0$ through $E^{m-1}$ follows:

$$GRQI = \frac{1}{m} \sum_{k=0}^{m-1} E^k, \tag{2}$$

where k is a point index, and in is the total number of points (e.g., a portion of points or all points in the model space or patient space) used for computing the point mean registration errors. Note that while equations (1) and (2) are used to as an example to illustrate computing a GRQI, any suitable algorithms for computing a global registration quality index may be used.

In some embodiments, a global registration quality indicator includes the GRQI. In some embodiments, the global registration quality indicator is determined based on the GRQI. For example, the global registration quality indicator may include a quality level having a value selected from "LOW," "MEDIUM," and "HIGH" determined based on GRQI. In an example where the GRQI is less than a global registration quality high threshold, the global registration quality indicator includes a quality level "HIGH." In another example where the GRQI is greater than a global registration quality low threshold, the global registration quality indicator includes a quality level "LOW." Yet in another example where the GRQI is between the global registration quality high threshold and global registration quality low threshold, the global registration quality indicator includes a quality level "MEDIUM."

While the method 700 of FIG. 7 for global registration quality analysis computes a distribution of registration transformations that span a range of expected initial parameters, those global registration transformations may be insensitive to misalignment of a subset of points, e.g., in a region of interest. Such a region of interest may be a region where a biopsy is performed by the operator to extract tissue or a region where a therapy is applied by the operator. As such, the local registration quality of a region of interest may be more important to the operator than the global registration quality. Referring to FIG. 8, illustrated is a method 800 for local registration quality analysis, which may provide a registration quality indicator associated with such smaller subset of points in a region of interest. In some embodiments, a local registration quality indicator may be computed by comparing consistency in registration transformation results associated with two or more regions in the model space.

The method 800 in FIG. 8 is illustrated as a set of operations or processes 802 through 810. Not all of the illustrated processes 802 through 810 may be performed in all embodiments of method 800. Additionally, one or more processes that are not expressly illustrated in FIG. 8 may be included before, after, in between, or as part of the processes 802 through 810. In some embodiments, one or more of the processes may be implemented, at least in part, in the form of executable code stored on non-transitory, tangible, machine-readable media that when run by one or more processors (e.g., the processors of control system 112) may cause the one or more processors to perform one or more of the processes.

The method 800 begins at a process 802, where a local registration is performed to register a region of interest of a model space to the patient space and generate a region of interest transformation $T_1$. Such a region of interest transformation $T_1$ may be computed using model points inside the region of interest of the model space. In some embodiments, the region of interest is provided by the operator. In some embodiments, at this stage, a global registration (e.g., process 508 of FIG. 5) has been performed using a set of optimal initial parameters to generating the transformation $T_{opt}$. The local registration to register the region of interest may be performed using that set of optimal initial parameters or a set of perturbed initial parameters generated based on a set of optimal initial parameters.

The method 800 may then proceed to a process 804, where a comparison region of the model space is determined. In some embodiments, the comparison region is determined based on the region of interest. For example, the comparison region may be the model space excluding the region of interest. In some embodiments, the comparison region is a region provided by the operator. In an example, the region of interest and comparison region may overlap. In another example, the region of interest and comparison region do not overlap. In yet another example, the region of interest and comparison region are not adjacent to each other. In yet another example, the region of interest and comparison regions may be fuzzy such that some points may be partial members of both regions. In an example for registration of points within the airways, the region of interest may consist of all points within a given lobe, while the comparison region is all points outside the lobe. In another example, the comparison region may include all points not within a lobe, but within the main stem bronchi. In yet another example, the comparison region may consist of points within an alternative lobe or multiple lobes.

The method 800 may then proceed to a process 806, where a local registration to register the comparison region of the model space to the patient space is performed to compute a comparison region transformation $T_2$ for the comparison region, Such a comparison region transformation $T_2$ may be computed only using points inside the comparison region of the model space. In some embodiments, the local registration to register the comparison region uses a set of initial parameters that is the same as the set of initial parameters used at the process 802 to register the region of interest.

The method 800 may then proceed to a process 808, where for each point $y^{k1}$ of the points within the region of interest, a point registration error $E^{k1}$ is computed based on the region of interest transformation $T_1$ and comparison region transformation $T_2$ as follows:

$$E^{k1} = \left\| T_1^{-1} y^{k1} - T_2^{-1} y^{k1} \right\|, \qquad (3)$$

where k1 is a point index of the points in the region of interest.

In some embodiments, processes 802 through 808 are repeated for n1 perturbations to generate perturbed transformations $$\left(T_1^0\right)^{-1}$$

through $$\left(T_1^{n1-1}\right)^{-1}$$

and $$\left(T_2^0\right)^{-1}$$

through $$\left(T_2^{n1-1}\right)^{-1}$$

for the region of interest and the comparison region respectively using n1 sets of perturbed initial parameters. Such perturbed initial parameters may be generated substantially similar to the perturbed initial parameters described above in FIG. 7. In some embodiments, in each of the n1 perturbations, the same set of perturbed initial parameters may be used to register the region of interest and comparison region to generate $$T_1^i$$

and $$T_2^i$$

respectively, wherein i is a perturbation index between 0 and n1-1. A point registration error $E^{k1}$ may be computed as a point mean registration error based on the perturbed transformations $$\left(T_1^0\right)^{-1}$$

through $$\left(T_1^{n1-1}\right)^{-1}$$

and $$\left(T_2^0\right)^{-1}$$

through $$\left(T_2^{n1-1}\right)^{-1}$$

as follows:

$$E^{k1} = \frac{1}{n1} \sum_{i=0}^{n1-1} \left\| \left(T_1^i\right)^{-1} y^{k1} - \left(T_2^i\right)^{-1} y^{k1} \right\|, \qquad (4)$$

where k1 is a point index of the points in the region of interest, i is a perturbation index, and n1 is the total number of perturbations for local registration quality analysis.

The method 800 may then proceed to a process 810, where a local registration quality index (LRQI) is computed using the mean error over all m1 points in the region of interest of the model space as follows:

$$LRQI = \frac{1}{m1} \sum_{k1=0}^{m1-1} E^{k1}, \qquad (5)$$

where k1 is the point index of the region of interest, and m1 is the total number of points in the region of interest. Note that while equations (3), (4), and (5) are used to as an example to illustrate computing a LRQI, any suitable algorithms for computing a local registration quality index may be used.

In some embodiments, a local registration quality indicator includes the LRQI, In some embodiments, the local registration quality indicator is determined based on the LRQI. For example, the local registration quality indicator may include a quality level having a value selected from "LOW," "MEDIUM," and "HIGH" determined based on LRQI. In an example where the LRQI is less than a local registration quality high threshold, the local registration quality indicator includes a quality level "HIGH." In another example where the LRQI is greater than a local registration quality low threshold, the local registration quality indicator includes a quality level "LOW." Yet in another example where the LRQI is between the local registration quality high threshold and local registration quality low threshold, the local registration quality indicator includes a quality level "MEDIUM." In some embodiments, such local/global registration quality high/low thresholds may be configured by the operator for a particular region of interest.

Referring to FIGS. 9 and 10, in some embodiments, actions performed (e.g., in process 512 of FIG. 5) based on the registration quality indicator may include performing registration again (re-registration) to improve the registration quality. Such a re-registration may be performed in a modified model space by excluding particular regions from the model space based on the registration quality indicators (e.g., a g local registration quality indicator and one or more local registration quality indicators).

The method 900 in FIG. 9 is illustrated as a set of operations or processes 902 through 910. Not all of the illustrated processes 902 through 910 may be performed in all embodiments of method 900. Additionally, one or more processes that are not expressly illustrated in FIG. 9 may be included before, after, in between, or as part of the processes 902 through 910. In some embodiments, one or more of the processes may be implemented, at least in part, in the form of executable code stored on non-transitory, tangible, machine-readable media that when run by one or more processors (e.g., the processors of control system 112) may cause the one or more processors to perform one or more of the processes.

The method 900 begins at a process 902, where a first set of regions of the model space and corresponding local registration quality thresholds are received. The first set of regions may include one or more regions of interest identified by the operator.

Referring to FIG. 10, illustrated therein is an exemplary visual representation to an operator. As illustrated in FIG. 10, a display 110 displays, in a user interface, a rendering of anatomic passageways of a human lung based upon anatomic model 600 of FIG. 6A. With the model space registered to the patient as described above in FIG. 5 (e.g., at process 508 of FIG. 5), the current shape of the elongate device 310 and the location of the distal end 318 may be located and displayed concurrently with the rendering of the passageways 601, which includes passageways 601A and 601B. The model points may be visually represented in a user interface by a plurality of points or dots on the display or as a rendered model, such as a mesh or wire model created based on the set of data points.

As illustrated in FIG. 10, in some embodiments, at a process 902, a set of regions including regions 1002 and 1004 are received. In an example, the regions 1002 and 1004 have the same registration quality thresholds. In another example, the regions 1002 and 1004 have different registration quality thresholds (e.g., based on their registration quality importance for an operator).

In some embodiments, at this stage of process 902, a global registration to register the entire model space to the patient space has already been performed to generate a transformation $T_{opt}$. In the example of FIG. 10, a global registration quality analysis has been performed, and the display 110 includes a global registration quality area 1006 displaying the global registration quality indicator (e. "HIGH") for the current global registration.

The method 900 may proceed to a process 904, where a local registration quality analysis (e.g., a method 800 of FIG. 8) may be performed for each region in the first set of regions. A local registration quality indicator may be generated for each region (e.g., using the corresponding local registration quality thresholds). In some embodiments, the local registration quality analysis receives a set of optimal initial parameters that is used for generating the transformation $T_{opt}$ for the global registration, and uses that set of optimal initial parameters and/or one or more sets of perturbed initial parameters generated based on that set of optimal initial parameters for performing registration for the regions as discussed above with respect to FIG. 8.

As illustrated in FIG. 10, in some embodiments, at the process 904, the display 110 may include a local registration quality area 1008 displaying the local registration quality indicators (e.g., "MEDIUM" for region 1002, "LOW" for region 1004) for the first set of regions that is generated at the process 904.

The method 900 may proceed to a process 906, where one or more regions to exclude are determined based on the global registration quality indicator and/or local registration quality indicators. In an example, a control system may determine the one or more regions to exclude (e.g., based on registration quality thresholds). In another example, as illustrated in FIG. 10, an operator may provide the one or more regions to exclude. In the example of FIG. 10, the display 110 includes a re-register area 1010, and the operator determines to not exclude region 1002 in the re-registration (e.g., using a choice 1012), but to exclude region 1004 in the re-registration (e.g., using a choice 1014).

The method 900 may proceed to a process 908 to generate a modified model space based on the one or more regions to exclude. In the example of FIG. 10, at a process 908, a modified model space is generated by excluding the region 1004 from the model space.

The method 900 may proceed to a process 910 to perform re-registration using the modified model space. In an example, such a re-registration is performed automatically by a control system based on the registration quality indicators and predetermined re-registration criteria. In another example, as illustrated in FIG. 10, an operator may start the re-registration with the modified model space by selecting the button 1016. While in some embodiments the operator may perform re-registration based on the local registration quality indicators associated with regions of interest, in other embodiments, the operator may perform re-registration based on the global registration quality indicator. By performing a re-registration using the modified model space, the registration quality (for the entire model space and/or particular regions) may be improved.

Referring to FIG. 11, in various embodiments, registration quality indicators may be displayed to an operator using various visual representations, including for example, number representations, graphical representations such as heat map using colors, shades, patterns, any suitable visual representation, and/or a combination thereof. As shown in the example of FIG. 11, a display 110 displays, in a user interface, a rendering of anatomic passageways of a human lung based upon anatomic model 600 of FIG. 6A, where the current shape of the elongate device 310 and the location of the distal end 318 are located and displayed concurrently with the rendering of the passageways 601. Further, a heat map (e.g., using shades, colors, patterns, etc.) based on the registration quality indicator is displayed in the anatomic model 600. For example, points in the region 1102 of the anatomic model 600 have registration quality indicator values indicating low quality (e.g., by comparing with one or more low registration quality thresholds). The region 1102 may have a first shade (e.g., light) or a first color (e.g., orange) associated with low quality. Points in the region 1104 have registration quality indicator values indicating medium quality (e.g., by comparing with one or more medium registration quality thresholds). As such, the region 1104 may have a second shade (e.g., medium) or a second color (e.g., yellow) associated with medium quality that is different from the first shade or the first color. Points in the region 1106 have registration quality indicator values indicating high quality (e.g., by comparing with one or more high registration quality thresholds). As such, the region 1106 may have a third shade (e.g., dark) or a third color (e.g., green) different from the first and second shades or the first and second colors. In various embodiments, an operator may accept the registration (e.g., by selecting button 1108 "Accept Registration") or restart the registration (by selecting button (e.g., by selecting button 1110 "Restart Registration") based on the visual representation of the registration quality indicators in the display 110.

The systems and methods of this disclosure may be used for connected bronchial passageways of the lung. The systems and methods may also be suited for navigation and treatment of other tissues, via natural or surgically created connected passageways, in any of a variety of anatomical systems including the colon, the intestines, the kidneys, the brain, the heart, the circulatory system, or the like. The systems and methods may also be suitable for navigation around the traceable surface of an organ. The methods and embodiments of this disclosure are also suitable for non-surgical applications.

One or more elements in embodiments of the invention may be implemented in software to execute on a processor of a computer system such as control system 112. When implemented in software, the elements of the embodiments of the invention are essentially the code segments to perform the necessary tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc.

Note that the processes and displays presented may not inherently be related to any particular computer or other apparatus. Various general-purpose systems may be used with programs in accordance with the teachings herein, or it may prove convenient to construct a more specialized apparatus to perform the operations described. The required structure for a variety of these systems will appear as elements in the claims. In addition, the embodiments of the invention are not described with reference to any particular programming language. It will be appreciated that a variety of programming languages may be used to implement the teachings of the invention as described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

What is claimed is:

1. A system comprising:
a non-transitory memory;
one or more processors coupled to the non-transitory memory and configured to read instructions to cause the system to perform operations comprising:

receiving a set of model points of a model of an anatomic structure of a patient, the model points being associated with a model space;
receiving, from a sensor system of an elongate device, a set of measured points of the anatomic structure of the patient, the measured points being associated with a patient space;
registering the set of model points to the set of measured points using a set of initial parameters to generate a first transformation;
perturbing the set of initial parameters to generate one or more sets of perturbed initial parameters;
registering the set of model points to the set of measured points using the one or more sets of perturbed initial parameters to generate one or more perturbed transformations;
generating a registration quality indicator based on the first transformation and the one or more perturbed transformations; and
based on the registration quality indicator being low, providing instructions to an operator, wherein the instructions comprise
instructions to re-register the set of model points to the set of measured points using the set of initial parameters to generate a revised first transformation.

2. The system of claim 1, wherein each set of the one or more sets of perturbed initial parameters is within a predetermined range of initial parameter values, and wherein the predetermined range is associated with uncertainty of the first transformation.

3. The system of claim 2, wherein each set of the one or more sets of perturbed initial parameters includes random initial parameter values within the predetermined range.

4. The system of claim 1, wherein a first set of perturbed initial parameters includes a perturbed transformation seed that is different from a transformation seed of the set of initial parameters.

5. The system of claim 1, wherein a first set of perturbed initial parameters includes a perturbed point weighting scheme that is different from a point weighting scheme of the set of initial parameters.

6. The system of claim 1, wherein a first set of perturbed initial parameters includes a perturbed correspondence configuration different from a correspondence configuration of the set of initial parameters.

7. The system of claim 1, wherein the generating the registration quality indicator includes:
generating a plurality of point registration errors associated with the anatomic structure based on the first transformation and the one or more perturbed transformations; and
generating a registration quality index of the registration quality indicator by computing a mean error of the plurality of point registration errors.

8. The system of claim 7, wherein the generating the plurality of point registration errors includes:
generating one or more perturbed point errors corresponding to the one or more perturbed transformations; and
computing a mean error of the one or more perturbed point errors.

9. The system of claim 7, wherein the plurality of point registration errors is associated with a target region of the anatomic structure.

10. The system of claim 1, wherein the instructions further comprise instructions to use intraoperative external imaging data as a navigational aid.

11. The system of claim 10, wherein the intraoperative external imaging data comprises one or more intraoperative fluoroscopic images or one or more intraoperative computed tomography (CT) images.

12. A non-transitory machine-readable medium comprising a plurality of machine-readable instructions which, when executed by one or more processors, are adapted to cause the one or more processors to perform a method comprising:

receiving a set of model points of a model of an anatomic structure of a patient, the model points being associated with a model space;

receiving, from a sensor system of an elongate device, a set of measured points of the anatomic structure of the patient, the measured points being associated with a patient space;

registering the set of model points to the set of measured points using a set of initial parameters to generate a first transformation;

perturbing the set of initial parameters to generate one or more sets of perturbed initial parameters;

registering the set of model points to the set of measured points using the one or more sets of perturbed initial parameters to generate one or more perturbed transformations;

generating a registration quality indicator based on the first transformation and the one or more perturbed transformations; and based on the registration quality indicator being low, providing instructions to an operator, wherein the instructions comprise instructions to re-register the set of model points to the set of measured points using the set of initial parameters to generate a revised first transformation.

13. The non-transitory machine-readable medium of claim 12, wherein each set of the one or more sets of perturbed initial parameters is within a predetermined range of initial parameter values, and wherein the predetermined range is associated with uncertainty of the first transformation.

14. The non-transitory machine-readable medium of claim 12, wherein a first set of perturbed initial parameters includes a perturbed transformation seed that is different from a transformation seed of the set of initial parameters.

15. The non-transitory machine-readable medium of claim 12, wherein a first set of perturbed initial parameters includes a perturbed point weighting scheme that is different from a point weighting scheme of the set of initial parameters.

16. The non-transitory machine-readable medium of claim 12, wherein a first set of perturbed initial parameters includes a perturbed correspondence configuration different from a correspondence configuration of the set of initial parameters.

17. The non-transitory machine-readable medium of claim 12, wherein the generating the registration quality indicator includes:

generating a plurality of point registration errors associated with the anatomic structure based on the first transformation and the one or more perturbed transformations; and generating a registration quality index of the registration quality indicator by computing a mean error of the plurality of point registration errors.

18. The non-transitory machine-readable medium of claim 17, wherein the generating the plurality of point registration errors includes:

generating one or more perturbed point errors corresponding to the one or more perturbed transformations; and computing a mean error of the one or more perturbed point errors.

19. The non-transitory machine-readable medium of claim 17, wherein the plurality of point registration errors is associated with a target region of the anatomic structure.

20. The non-transitory machine-readable medium of claim 12, wherein the method further comprises:

comparing the registration quality indicator with a registration quality threshold to generate a comparison result.

\* \* \* \* \*